(12) United States Patent
Dykas et al.

(10) Patent No.: US 10,811,827 B1
(45) Date of Patent: Oct. 20, 2020

(54) CORD DISCONNECT APPARATUS AND METHODS

(71) Applicant: Power Products, LLC, Menomonee Falls, WI (US)

(72) Inventors: Thom Dykas, Bellingham, WA (US); Danny Ascencio-Hall, Bellingham, WA (US); Andrew Brown, Bellingham, WA (US)

(73) Assignee: Power Products, LLC, Menomonee Falls, WI (US)

( * ) Notice: Subject to any disclaimer, the term of this patent is extended or adjusted under 35 U.S.C. 154(b) by 0 days.

(21) Appl. No.: 16/554,081

(22) Filed: Aug. 28, 2019

Related U.S. Application Data

(63) Continuation of application No. 15/784,887, filed on Oct. 16, 2017.

(60) Provisional application No. 62/408,529, filed on Oct. 14, 2016.

(51) Int. Cl.
*H01R 13/62* (2006.01)
*H01R 13/713* (2006.01)
*H01R 13/639* (2006.01)

(52) U.S. Cl.
CPC ....... *H01R 13/7132* (2013.01); *H01R 13/639* (2013.01)

(58) Field of Classification Search
CPC .................................................. H01R 13/633
USPC ........................................ 439/152–159, 660
See application file for complete search history.

(56) References Cited

U.S. PATENT DOCUMENTS

| | | | |
|---|---|---|---|
| 1,971,990 | A | 8/1934 | Reynolds et al. |
| 2,551,533 | A | 5/1951 | Gernheuser |
| 2,688,734 | A | 9/1954 | Welling |
| 2,817,825 | A | 12/1957 | Zette et al. |
| 2,986,612 | A | 5/1961 | Healy |
| 3,452,167 | A | 6/1969 | Fee |
| 3,475,715 | A | 10/1969 | Venaleck |
| 3,585,323 | A | 6/1971 | Appleton et al. |
| 3,596,019 | A | 7/1971 | Koester |

(Continued)

FOREIGN PATENT DOCUMENTS

| | | |
|---|---|---|
| CN | 203839603 U | 9/2014 |
| DE | 2512193 A1 | 10/1976 |

(Continued)

OTHER PUBLICATIONS

"Micro Switch Premium Miniature Basic Switches V7 Series", Honeywell catalog, 9 pages.

(Continued)

*Primary Examiner* — Phuong K Dinh
(74) *Attorney, Agent, or Firm* — Andrus Intellectual Property Law, LLP

(57) ABSTRACT

A power cord disconnect apparatus and methods of disconnecting a power cord. An ejection mechanism may include a scotch yoke assembly, the scotch yoke being reciprocatable to engage and eject a power cord plug out of a receptacle. The apparatus may include a power circuit with a normally-open first switch closing in response to the plug being inserted into the receptacle and a normally-closed second switch opening in response to a signal, power being transferred between the power cord and the power circuit when the first switch and second switch are closed, power being prevented if either the first or second switch opens.

19 Claims, 26 Drawing Sheets

(56) References Cited

U.S. PATENT DOCUMENTS

| | | |
|---|---|---|
| 3,598,941 A | 8/1971 | Nelson |
| 3,843,854 A | 10/1974 | Mori et al. |
| 4,034,172 A | 7/1977 | Glover et al. |
| 4,138,177 A | 2/1979 | Van Valer |
| 4,157,855 A | 6/1979 | Chan |
| 4,314,735 A | 2/1982 | Fullenkamp et al. |
| D308,665 S | 6/1990 | Kussmaul |
| 5,220,268 A | 6/1993 | Rose et al. |
| 5,266,040 A | 11/1993 | Merrill et al. |
| 5,429,524 A | 7/1995 | Wakata et al. |
| 5,635,690 A | 6/1997 | Knecht et al. |
| 5,645,439 A | 7/1997 | Nugent, Jr. et al. |
| 5,800,189 A | 9/1998 | Ahmed |
| 5,831,802 A | 11/1998 | Ahmed et al. |
| 5,921,794 A | 7/1999 | Koch |
| 6,062,883 A | 5/2000 | Schreiber et al. |
| 6,540,533 B1 | 4/2003 | Schreiber |
| 6,554,692 B2 | 4/2003 | Koch |
| 7,044,759 B2 | 5/2006 | Hughes |
| 7,234,953 B2 | 6/2007 | Chen |
| 7,344,393 B2 | 3/2008 | Buller et al. |
| 7,431,601 B2 * | 10/2008 | Nugent, Jr. ........ H01R 13/7132 200/51.1 |
| 8,087,316 B2 * | 1/2012 | Holtgraver .......... F16K 31/1635 74/50 |
| 9,048,570 B2 | 6/2015 | Goel |
| 2002/0064983 A1 | 5/2002 | Patey |
| 2004/0192092 A1 | 9/2004 | Borrego Bel et al. |
| 2004/0266236 A1 | 12/2004 | Hughes |
| 2008/0146058 A1 | 6/2008 | Nugent et al. |
| 2015/0194763 A1 | 7/2015 | Gagne et al. |
| 2015/0364866 A1 | 12/2015 | Gagne et al. |
| 2016/0036162 A1 | 2/2016 | Ohler |
| 2018/0109048 A1 * | 4/2018 | Dykas ................. H01R 13/639 |

FOREIGN PATENT DOCUMENTS

| | | |
|---|---|---|
| DE | 102011050998 A1 | 6/2012 |
| EP | 2479865 A1 | 7/2012 |
| EP | 2672594 A1 | 12/2013 |
| KR | 101463598 B1 | 11/2014 |
| WO | WO 9739497 A1 | 10/1997 |
| WO | WO 2004077613 A2 | 9/2004 |
| WO | WO 2005081367 A1 | 9/2005 |
| WO | WO 2012041742 A2 | 4/2015 |
| WO | WO 2015100501 A1 | 7/2015 |

OTHER PUBLICATIONS

"V7-1Z10E9-263 Switch", Honeywell, 3 pages, Aug. 30, 2016.
Extended European Search Report from the European Patent Office for Application No. 17196556.9 dated Aug. 1, 2018 (19 pages).
Partial European Search Report from the European Patent Office for Application No. 17196556.9 dated Feb. 15, 2018 (14 pages).
Zhuang, Zin, "Solidworks—Scotch Yoke Mechanism in Jigsaw" Seelio.cim, Oct. 31, 2016, Retrieved from internet: URL:https://seelio.com/w/2kga/solidworks-_-scotch-yoke-mechanism-in-jigsaw.
Ersoy, Seyhan, "Scotch Yoke with Dwell at One End", Mekanizmalar. com, Dec. 30, 2011, retrieved from internet: URL:https://www.mekanizmalar.com/scotch_yoke_with_dwell_at_one_end.html.

* cited by examiner

CORD DISCONNECT APPARATUS AND METHODS

CROSS REFERENCE TO RELATED APPLICATIONS

This application is a continuation of U.S. patent application Ser. No. 15/784,887, filed on Oct. 16, 2017, which claims priority U.S. Provisional Patent Application Ser. No. 62/408,529, filed Oct. 14, 2016.

FIELD

The present invention relates to electrical connectors and, more particularly, to an apparatus for disconnecting a power cord from a power circuit.

SUMMARY

When not in use, some vehicles (e.g. boats, emergency vehicles (fire trucks, ambulances), electric vehicles, etc.) may be connected by a power cord to a fixed power supply. When the vehicle departs, the power cord should be uncoupled and, in some cases (e.g., when responding to an emergency call), may do so swiftly and/or automatically to, for example, avoid interference with vehicle departure, damage to the system components (e.g., from pulling force, arcing, etc.), etc.

In some cases, when the power cord is disconnected (e.g., ejected, removed by hand), arcing between the inter-engaging electrical contacts may be eliminated or inhibited to avoid reducing the service life of the system components, creating undesirable operational conditions, etc.

While, in some cases, the force required to disconnect the power cord may met by solenoid- or spring-powered mechanisms, in other cases (e.g., with increased power demands and connector sizes), a mechanism providing a more positive and increased force may be needed.

One-handed connection of the power cord may be desired. A self-resetting ejection mechanism may reduce interference during and the force required for insertion of the power cord. Similarly, cooperation between the power cord and the ejection mechanism (e.g., the door or cover) to accurately and easily position and insert the cord may facilitate such insertion of the power cord.

In one independent embodiment, a cord disconnect apparatus may generally include a housing defining a receptacle for a plug of a power cord; and an ejection mechanism including a scotch yoke assembly supported by the housing, the scotch yoke being reciprocatable to engage and eject the plug from the receptacle. The scotch yoke assembly may then be retractable in preparation for plug reinsertion.

In some constructions, the scotch yoke assembly may include a link defining a slot, and a piston rod connected to the link, the piston rod being extendable into the receptacle to engage and eject the plug. The apparatus may include a rotating member supporting an eccentric pin, the pin being positioned in the slot, the rotating member being rotatable about an axis to cause the eccentric member to revolve around the axis, movement of the eccentric pin causing reciprocation of the scotch yoke assembly.

The link may have a slot surface defining the slot, and the mechanism may further include a roller supported on the pin and engaging the slot surface. The piston rod may reciprocate along an ejection axis, and the slot surface may have an intermediate portion and a first outer portion and a second outer portion on opposite sides of the intermediate portion, the first outer portion and the second outer portion being in alignment and oriented transverse to the axis, the intermediate portion projecting axially from the first outer portion and the second outer portion, the roller moving along the first outer portion, the intermediate portion and the second outer portion during movement of the eccentric pin. The roller may rotate about a roller axis, the roller having axially-spaced apart flanges restricting relative movement between the roller and the link in a direction of the roller axis.

The apparatus may include a motor; and a gear assembly driven by the motor, the gear assembly being operable to rotate the rotating member. The apparatus may include a sensor assembly operable to sense a complete rotation of the rotating member. The sensor assembly may include a protrusion on the rotating member and a switch engageable with the protrusion upon a complete rotation of the rotating member.

In some constructions, the cord may be connectable to a first circuit, and the apparatus may further include an apparatus circuit supported by the housing, the apparatus circuit being connectable between a second circuit and the first circuit, the apparatus circuit including a first switch closing in response to the plug being in the receptacle, and a second switch opening in response to a signal, transfer between first circuit and the second circuit being facilitated when the first switch and second switch are closed, transfer being prevented when the first switch or the second switch is open. The first circuit may include a first power circuit, the second circuit may include a second power circuit, and the apparatus circuit may include an electrical circuit. The apparatus may be supportable on a vehicle including a vehicle engine, the signal opening the second switch including an engine start signal.

The apparatus may include a plug sensor engageable by the plug to close the first switch. The plug sensor may include a lever supported proximate the receptacle and movable between an engaged position, in which the plug engages the lever to cause the first switch to close, and a disengaged position, in which the switch opens.

In some constructions, the plug is insertable into the receptacle along an insertion axis, the plug having a radial outer surface, and the apparatus may further include a door operable to close the receptacle, the door including an axially-extending door surface, the outer surface of the plug being engageable with the door surface and the plug being movable transverse to the insertion axis to open the door.

The plug may include a plug terminal, and the apparatus may include an apparatus terminal engageable with the plug terminal when the plug is in the receptacle in a first orientation of the plug about the insertion axis, the apparatus terminal and the plug terminal not being engageable in a different second orientation of the plug about the insertion axis. The apparatus may include a locating assembly operable to orient the plug in the first orientation for insertion. The locating assembly may include a key supported on one of the plug and the door engageable in a keyway defined on the other of the plug and the door. The door surface may define the keyway. The housing may include a projection engageable in the keyway in a closed position of the door.

The door may include a telescoping door. The apparatus may include an indicator positioned proximate the receptacle and operable to indicate a status of the apparatus.

In another independent embodiment, a disconnect apparatus may generally include a housing defining a receptacle for a plug of a cord connected to a first circuit; and an apparatus circuit supported by the housing, the apparatus circuit being connectable between a second circuit and the first circuit, the apparatus circuit including a first switch closing in response to the plug being in the receptacle, and a second switch opening in response to a disconnect signal, transfer between first circuit and the second circuit being facilitated when the first switch and second switch are closed, transfer being prevented when the first switch or the second switch is open.

In some constructions, the first circuit may include a first power circuit, the second circuit may include a second power circuit, and the apparatus circuit may include an electrical circuit. The second switch may include a power relay having a connect condition, in which the first power circuit is electrically connected to the second power circuit, and a disconnect condition, in which the first power circuit and the second power circuit are electrically disconnected. The electrical circuit may further include an electronic controller configured to receive a first signal from the first switch representative of the first switch being open, receive the disconnect signal, and control the relay to the disconnect condition when the first signal or the disconnect signal is received.

In some constructions, the apparatus may include an ejection mechanism operable between an eject condition, in which a portion of the ejection mechanism extends into the receptacle and engages and ejects the plug, and a retracted condition, in which the portion of the ejection mechanism is retracted from the receptacle, and the controller may be configured to operate the ejection mechanism to eject the plug when the disconnect signal is received. When the disconnect signal is received, the controller may be configured to operate the ejection mechanism after controlling the relay to the disconnect condition.

The apparatus may include a sensor assembly operable to sense and output a signal to the controller representative of the retracted condition of the portion of the ejection mechanism. The apparatus may include an indicator operable to provide an indication of a status of the electrical circuit, and wherein the controller is operable to control the indicator.

In yet another independent embodiment, a method for ejecting a cord may be provided, the cord including a plug receivable in a receptacle defined by a housing. The method may generally include reciprocating a scotch yoke assembly to engage and eject the plug from the receptacle. The scotch yoke assembly may thereafter be retracted in preparation for reinsertion of the cord plug.

The scotch yoke assembly may include a link defining a slot, and a piston rod connected to the link, and reciprocating may include extending the piston rod into the receptacle to engage and eject the plug. The method may include positioning in the slot an eccentric pin supported on a rotating member supporting an eccentric pin; and rotating the rotating member about an axis to cause the eccentric member to revolve around the axis, movement of the eccentric pin causing reciprocation of the scotch yoke assembly. The method may include operating a motor to drive a gear assembly to rotate the rotating member.

In some constructions, the cord may be connectable to a first circuit, and the method may further include connecting an apparatus circuit supported by the housing between a second circuit and the first circuit to facilitate transfer between the first circuit and the second circuit when a first switch in the apparatus circuit closes in response to the plug being in the receptacle and when a second switch in the apparatus circuit is closed; and preventing transfer between the first circuit and the second circuit when the first switch is open or when the second switch opens in response to a signal. The first circuit may include a first power circuit the second circuit may include a second power circuit, and the apparatus circuit may include an electrical circuit.

In a further independent embodiment, a method of disconnecting a circuit may be provided. The method may generally include closing a first switch in response to a plug of a cord being in a receptacle defined by a housing; thereafter, with a normally-closed second switch closed, transferring between a first circuit and a second circuit through the cord; and deactivating transfer by each of opening the first switch in response to the plug moving out of the receptacle, and opening the second switch in response to a disconnect signal.

In some constructions, the first circuit may include a first power circuit, and the second circuit may include a second power circuit. The second switch may include a power relay, and opening the second switch may include operating to a disconnect condition, in which the first power circuit and the second power circuit are electrically disconnected. Deactivating may include, with an electronic controller, receiving a first signal from the first switch representative of the first switch being open, receiving the disconnect signal, and controlling the relay to the disconnect condition when the first signal or the disconnect signal is received. When the disconnect signal is received and after controlling the relay to the disconnect condition, the method may include operating an ejection mechanism to an eject condition, in which a portion of the ejection mechanism extends into the receptacle and engages and ejects the plug.

In another independent embodiment, a cover assembly for a receptacle may be provided, the receptacle being defined by a housing, the receptacle being operable to receive along an axis a plug of a cord. The cover assembly may generally include a support member supportable by the housing and defining an opening communicating with the receptacle; and a telescoping door assembly supported by the support member between a closed position, in which the door assembly covers the receptacle, and an open position, in which the receptacle is accessible through the opening, the door assembly including a plurality of door sections slidable transverse to the axis between the closed position and the open position.

The plug may have a radial outer surface having a contour, and the plurality of door sections may include a first door section defining an end of the door assembly, the end having a door surface engageable by the outer surface of the plug to move the door from the closed position to the open position.

The receptacle has a receptacle terminal, and the plug has a plug terminal engageable with the receptacle terminal in an engagement orientation of the plug relative to the receptacle, the plug terminal not being engageable with the receptacle terminal in a different orientation of the plug relative to the housing. The cover assembly may include a locating assembly operable to locate the plug in the engagement orientation relative to the receptacle, the locating assembly including a key on one of the door assembly and the plug and engageable in a keyway defined on the other of the door assembly and the plug. The keyway may be defined on the door assembly.

In yet another independent embodiment, a cover assembly for a receptacle may be provided, the receptacle being defined by a housing, the receptacle being operable to receive along an axis a plug of a cord, the receptacle including a receptacle terminal, the plug having a radial outer surface and including a plug terminal, the plug terminal being engageable with the receptacle terminal in an engagement orientation of the plug relative to the receptacle, the plug terminal not being engageable with the receptacle terminal in a different orientation of the plug relative to the housing. The cover assembly may generally include a support member supportable by the housing and defining an opening communicating with the receptacle; a door assembly supported by the support member between a closed position, in which the door assembly covers the receptacle, and an open position, in which the receptacle is accessible through the opening, the door assembly being slidable transverse to the axis between the closed position and the open position, the door assembly having an end with a door surface engageable by the outer surface of the plug to move the door from the closed position to the open position; and a locating assembly operable to locate the plug in the engagement orientation relative to the receptacle, the locating assembly including a key on one of the door assembly and the plug and engageable in a key way defined on the other of the door assembly and the plug.

The keyway may be defined on the door assembly. The door assembly may include a telescoping door assembly with a plurality of door sections slidable transverse to the axis between the closed position and the open position.

Other independent aspects of the invention may become apparent by consideration of the detailed description, claims and accompanying drawings.

BRIEF DESCRIPTION OF THE DRAWINGS

FIG. 3 is a perspective view of the disconnect apparatus of FIG. 1 with the housing removed.

DETAILED DESCRIPTION

Figure 1:
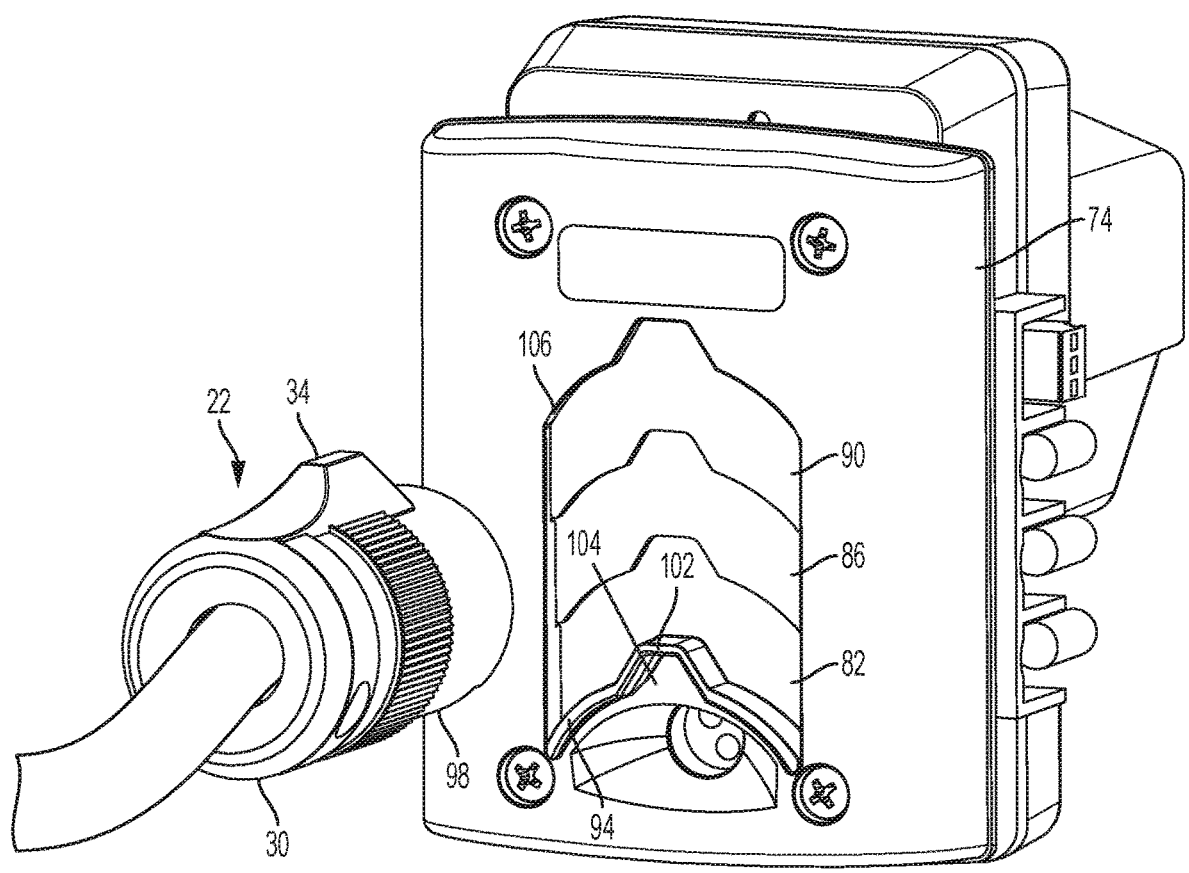
FIG. 1 is a perspective view of a disconnect apparatus, illustrating a plug of a cord disconnected.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

A cord disconnect apparatus 10 is shown in the drawings. The apparatus 10 operates to connect and disconnect (mechanically and electrically) a power cord 14 and a load (see FIGS. 8 and 13-14). In the illustrated construction, the apparatus 10 is supported on a vehicle (not shown; for example, a boat, another marine vessel, an emergency/first responder vehicle (a fire truck, an ambulance), an electric vehicle, etc.)), and the load is an electrical load of the vehicle. The cord 14 is connected to a power source (not shown) and connectable to the load through a power circuit 18 of the apparatus 10 to power the vehicle load.

In other constructions (not shown), power may be provided from the vehicle through the power cord 14. In yet other constructions (not shown), the cord 14 may be a cable, connector, pipe, etc., operable to transfer media (e.g., fluid), transmit data, signals, etc. from a source (not shown) and the vehicle or vice versa.

The cord 14 has a plug 22 including (see FIG. 4) female electrical contacts 26 supported on a plug housing 30. The plug housing 30 includes a projection or key 34 with a contoured portion 36 for a user's thumb. The female electrical contacts 26 are available to be mated with male electrical contacts through a front face 38.

Figure 2:
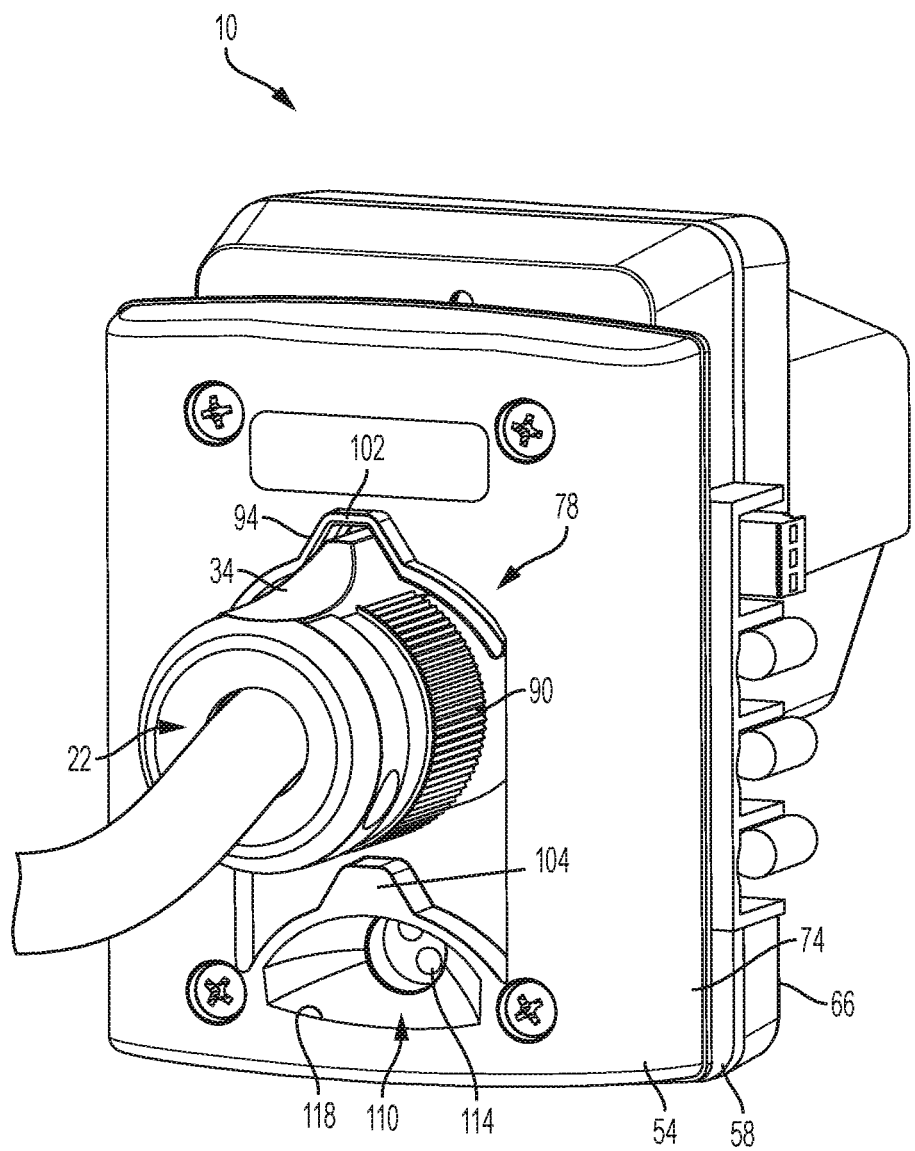
FIG. 2 is a perspective view of the disconnect apparatus of FIG. 1, illustrating the plug received in the receptacle.

The apparatus 10 generally includes (see FIGS. 1-2) a housing assembly 42, (see FIG. 8) the power circuit 18, and (see FIGS. 3-6) a drive mechanism 46. The housing assembly 42 has a front member 54, an intermediate member 58 and a rear member 66 enclosing components of the apparatus 10. The front member 54 defines (see FIG. 2) a receptacle 70 for the plug 22 on its front surface 74.

In the illustrated construction, a cover or door assembly 78 selectively closes the receptacle 70. FIGS. 16-25 illustrate the door assembly 78 and the plug 14 in more detail.

The illustrated door assembly 78 is slidingly supported on the front member 54 and includes a number of telescoping door sections 82, 86, 90 . . . n. A first section 82 includes a contoured portion 94 engageable by an outer plug surface 98 and a recess or keyway 102 to receive the key 34 of the plug 22. A complementary key 104 is defined proximate the receptacle 70 for engagement in the keyway 102 when the door assembly 78 is in the closed position.

Engagement of the contoured portion 94 with the outer plug surface 98 facilitates opening of the door assembly 78. As discussed below in more detail, engagement of the key 34 in the keyway 102 properly orients cooperating structure of the plug 22 and the apparatus 10 (e.g., the plug and apparatus terminals).

The front member 54 defines a groove 106 receiving the door sections 82, 86, 90 for sliding movement between a closed position (see FIG. 1), in which the receptacle 70 is covered, and an open position (see FIG. 2), in which the receptacle 70 is open and the plug 22 is inserted or insertable therein. The door assembly 78 is biased to the closed position, for example, by a biasing arrangement, such as one or more spring members (not shown), gravity, etc., applying a force to the door section(s) 82, 86, 90. During insertion of the plug 22, the outer plug surface 98 is engaged against the contoured portion 94, and the user applies a force to move the door sections 82, 86, 90 to the open position against the biasing force.

It should be understood that the multi-section telescoping door assembly 78 may be used to selectively cover other devices, such as an electrical outlet, independently of other components of the apparatus 10. The illustrated front member 54 with the door assembly 78 may be added/retrofitted to an existing receptacle (not shown). Likewise, an existing cord (not shown) can be modified to include the illustrated plug 14 to interact with the door assembly 78.

Figure 9:
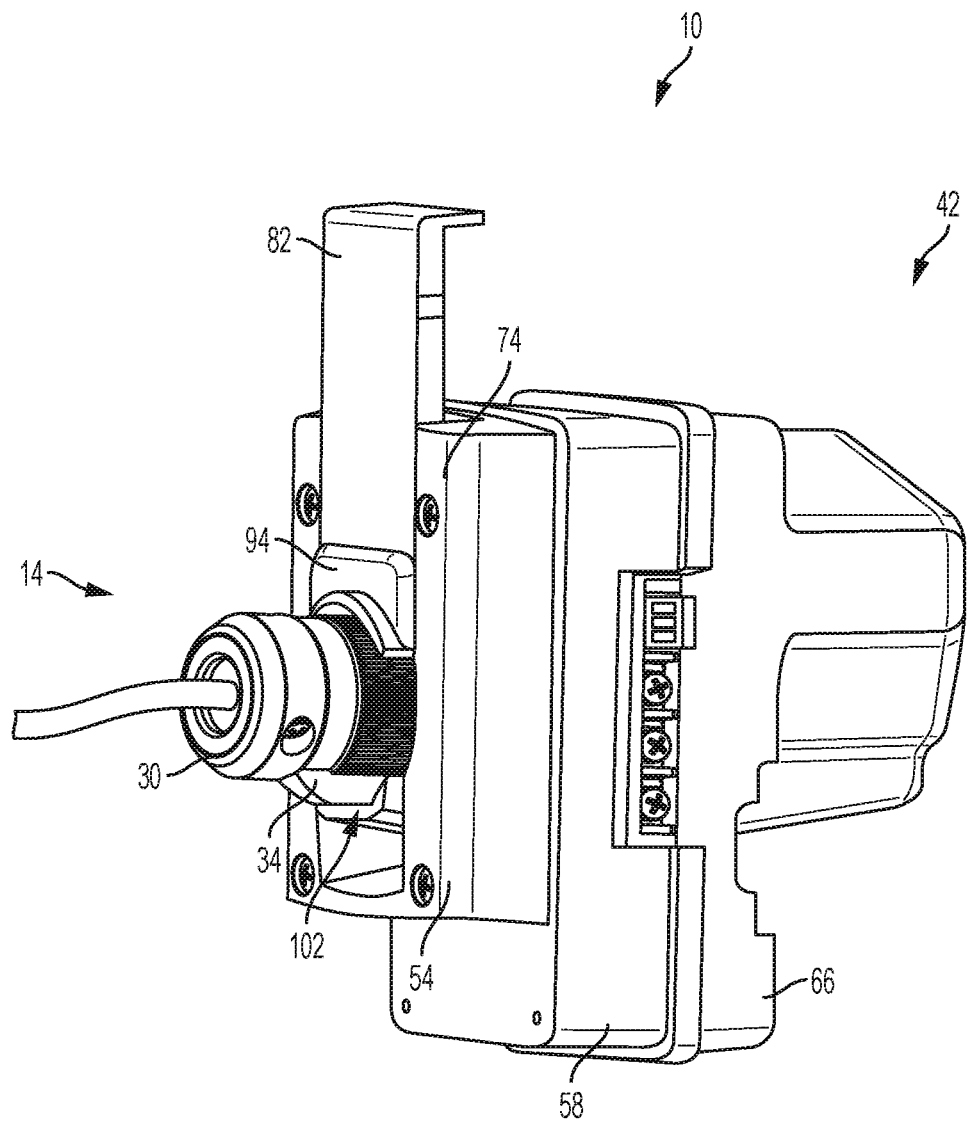
FIG. 9 is a perspective view of an alternative construction of a disconnect apparatus.

In other constructions (see FIG. 9), the door assembly 78 includes a single sliding door section 82 which, in the open position, extends outside of the front member 54. The door section 82 provides the contoured portion 94 for engagement with the outer plug surface 98. Also, in this construction, rather than being defined on the door section 82, the keyway 102 is defined by the front member 74.

The apparatus 10 also includes an indicator portion 110 to provide an indication (e.g., visual, audible, tactile, etc.) of conditions of the apparatus 10. A recess 114 is defined on the front member 54 and houses one or more indicators, such as light-emitting diodes (LEDs) 118, to indicate to the user the operational status of the apparatus 10 (e.g., the connection status, whether power is being supplied, etc.). As shown in FIGS. 16-19, a lens 120 covers the LEDs 118.

In the illustrated construction, when the power cord 14 is connected to the apparatus 10, the LEDs 118 are on, and, when power is being transferred, the LEDs 118 are off. When there is a notification or fault condition, the LEDs 118 are flashing.

Figure 3:
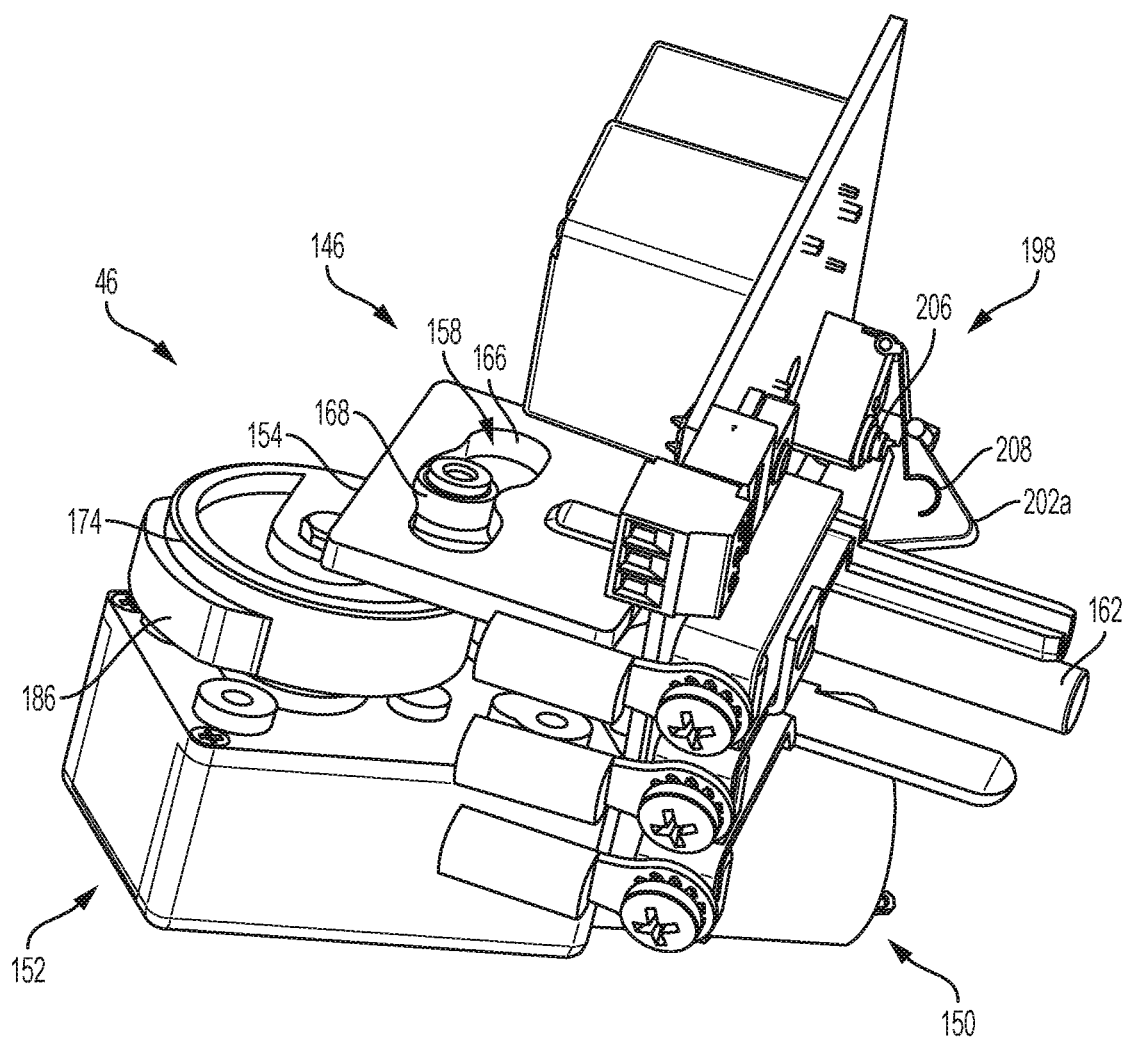
FIG. 3
Figure 7:
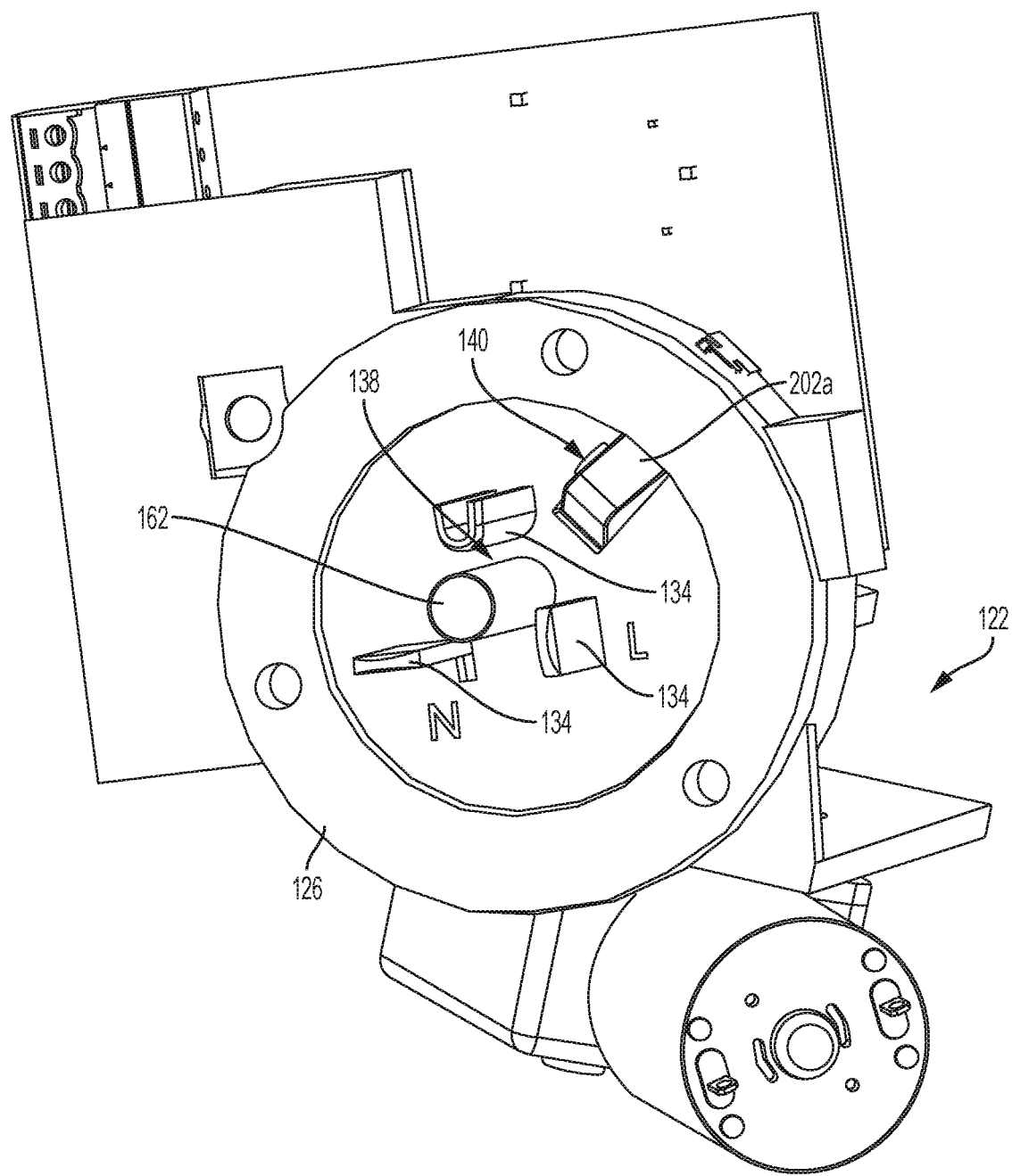
FIG. 7 is a front perspective view of a portion of the disconnect apparatus.

As shown in FIGS. 3 and 7, a frame assembly 122, including a front support 126 and a rear support 130, is supported in the housing assembly 42. The front support 126 supports male electrical contacts 134 and defines (see FIG. 7) apertures 138 and 140.

Figure 4:
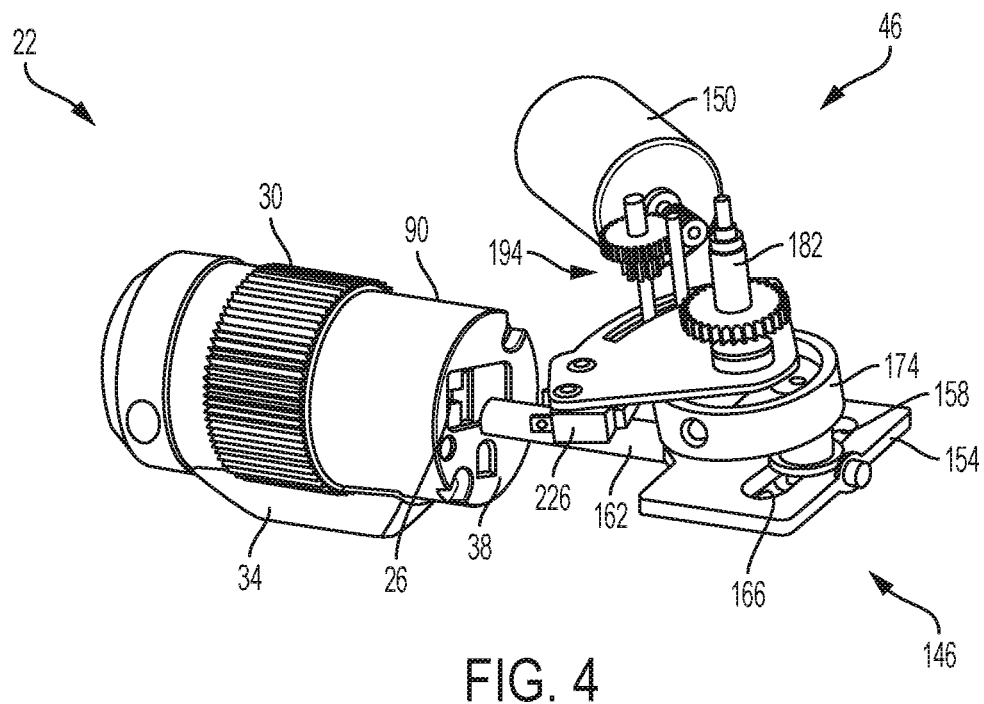
FIG. 4 is a perspective view of a portion of the disconnect apparatus of FIG. 1, illustrating a scotch yoke assembly engaging the plug.
Figure 5:
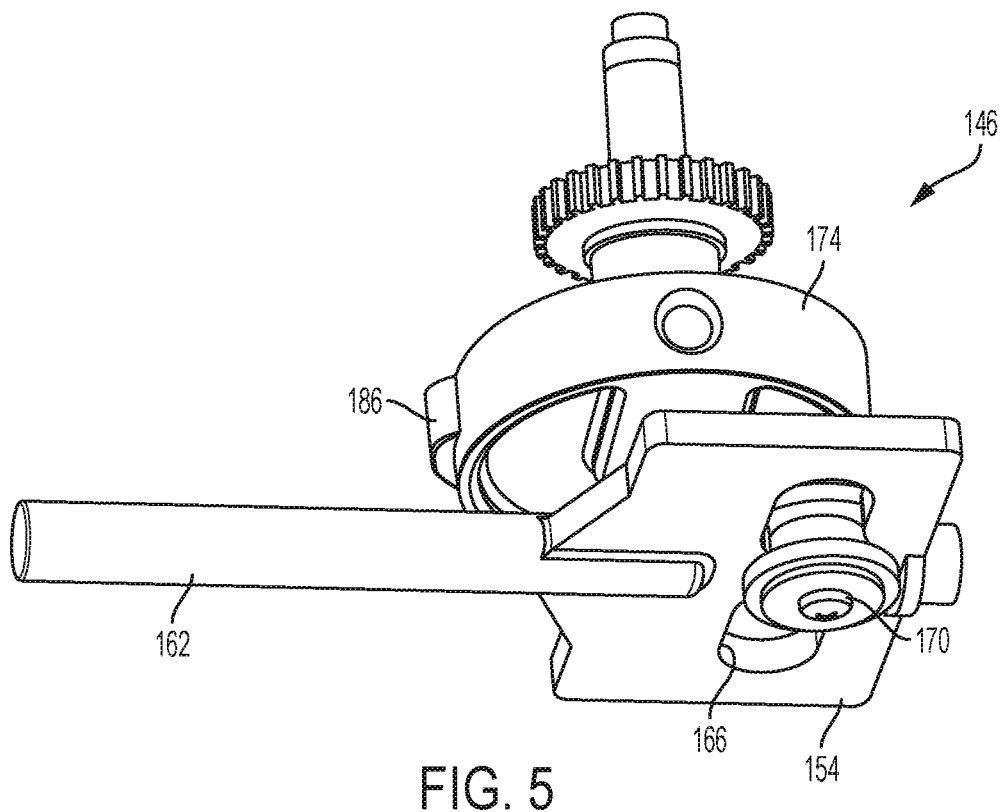
FIG. 5 is a perspective view of the scotch yoke assembly shown in FIG. 4.
Figure 6:
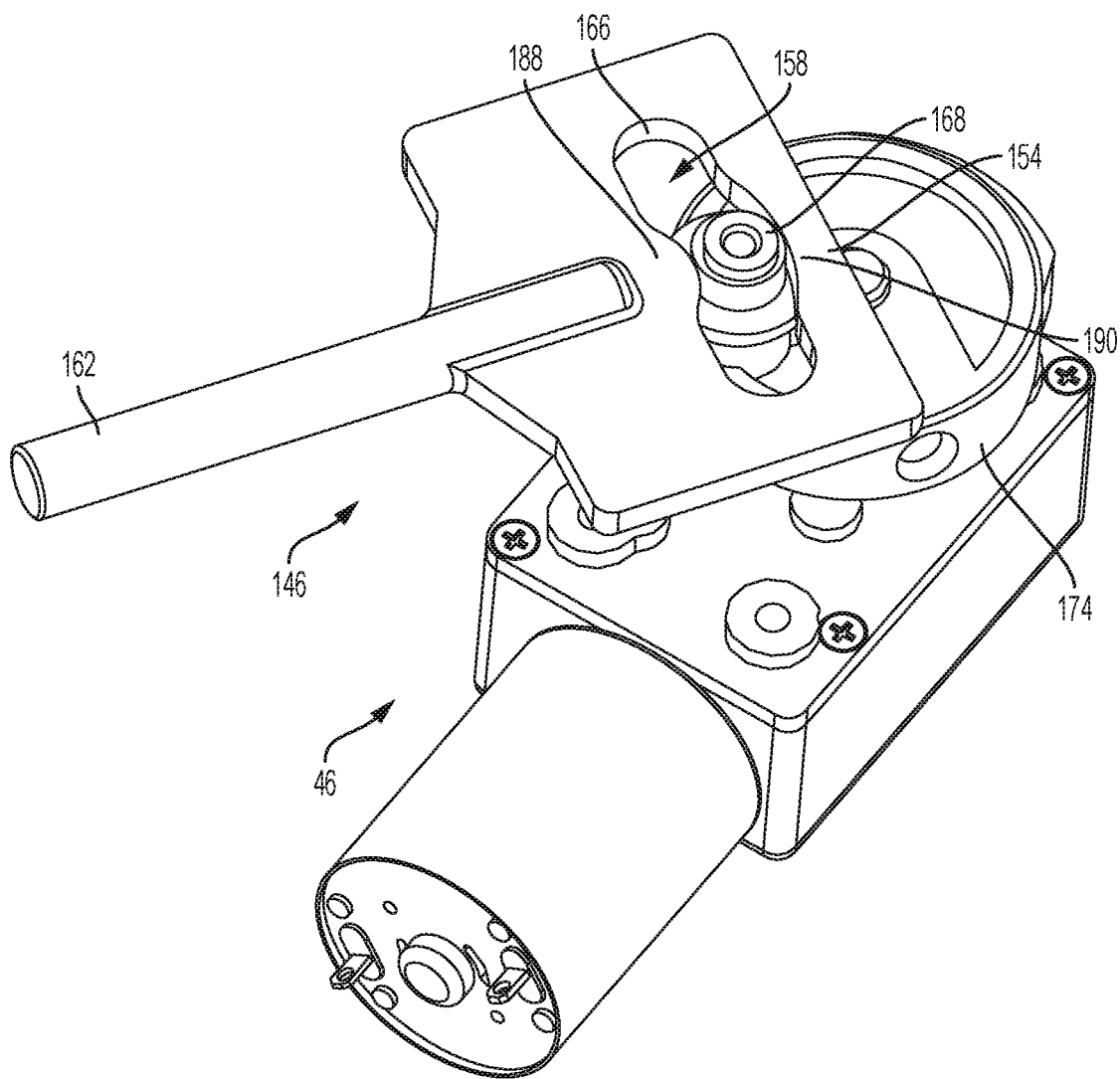
FIG. 6 is another perspective view of the scotch yoke assembly shown in FIG. 4.

The drive mechanism 46 is supported on the rear support 130. The illustrated drive mechanism 46 includes (see FIGS. 3-7) a scotch yoke assembly 146 driven by a motor 150 through a gear assembly 152. The scotch yoke assembly 146, as seen in FIGS. 4-6, includes a link 154 with a slot 158 and a piston or slider 162 connected to the link 154 and extendable through the central aperture 138 in the front support 126.

The slot 158 has a slot surface 166 and receives a roller 168 supported on a pin 170 supported eccentrically on a rotating member 174. In some constructions (see FIGS. 4-5), the roller 168 is flanged to capture the link 154. The rotating member 174 has an aperture 178 into which an output shaft 182 of the gear assembly 152 is inserted and a radial protrusion 186. The gear assembly 152 is driven by the motor 150 to rotate the output shaft 182 and the rotating member 174.

As the rotating member 174 rotates, movement of the eccentric pin 170 in the slot 158 and the roller 168 along the surface 166 causes linear reciprocating movement of the slider 162 into and out of the aperture 138. As the slider 162 extends out of the aperture 138 (as shown in FIGS. 3 and 6-7), the slider 162 engages the front face 38 of the plug housing 30 to push the plug 22 out of the receptacle 70. When the slider 162 retracts into the aperture 138 (as shown in FIGS. 4-5), the scotch yoke assembly 146 is reset so that the plug 22 can be inserted into the receptacle 70.

The shape of the slot surface 166 of the slot 158 controls movement of the slider 162. In the illustrated construction (see FIG. 6), the inner surface 166 generally extends laterally in the link 154. On the forward side, along the axis of the slider 162, the surface 166 has a rearwardly-extending projection 188, and, on the rearward side, a complementary recess 190. On each side of the projection 188 and the recess 190, the slot surface 166 is generally aligned with transverse to the axis of the slider 162.

As the slider 162 finishes the forward stroke (see FIGS. 3 and 6 illustrating the "extended" position), the roller 168 moves from one end of the slot 158 and along the projection 188, causing the slider 162 to pause or, depending on the height of the project 188, slightly retract and then extend. As the slider 162 finishes the return stroke (see FIGS. 4-5 illustrating the "retracted" position), the roller 168 moves from the other end of the slot 158 and into the recess 190.

The recess 190 enables further retraction of the slider 162 in the retracted position (at the depth of the recess 190). On moving to the forward stroke, the slider 162 will be extended more quickly, as the roller 168 comes out of the recess 190 and the pin 170 is rotated in the forward direction.

In other constructions (not shown), the surface 166 of the slot 158 may have a different shape (e.g., a simple linear slot) depending on the desired movement of the slider 162.

It should be understood that, in some constructions (not shown) and for some aspects, the drive mechanism 46 may include a rack and pinion mechanism, such as that shown in U.S. Pat. No. 7,431,601, issued Oct. 7, 2008, the entire contents of which is hereby incorporated by reference. In still other constructions (not shown), the drive mechanism 46 may include a solenoid- or spring-powered mechanism, such as that shown in U.S. Pat. No. 5,645,439, issued Jul. 8, 1997, the entire contents of which are also hereby incorporated by reference.

Figure 8:
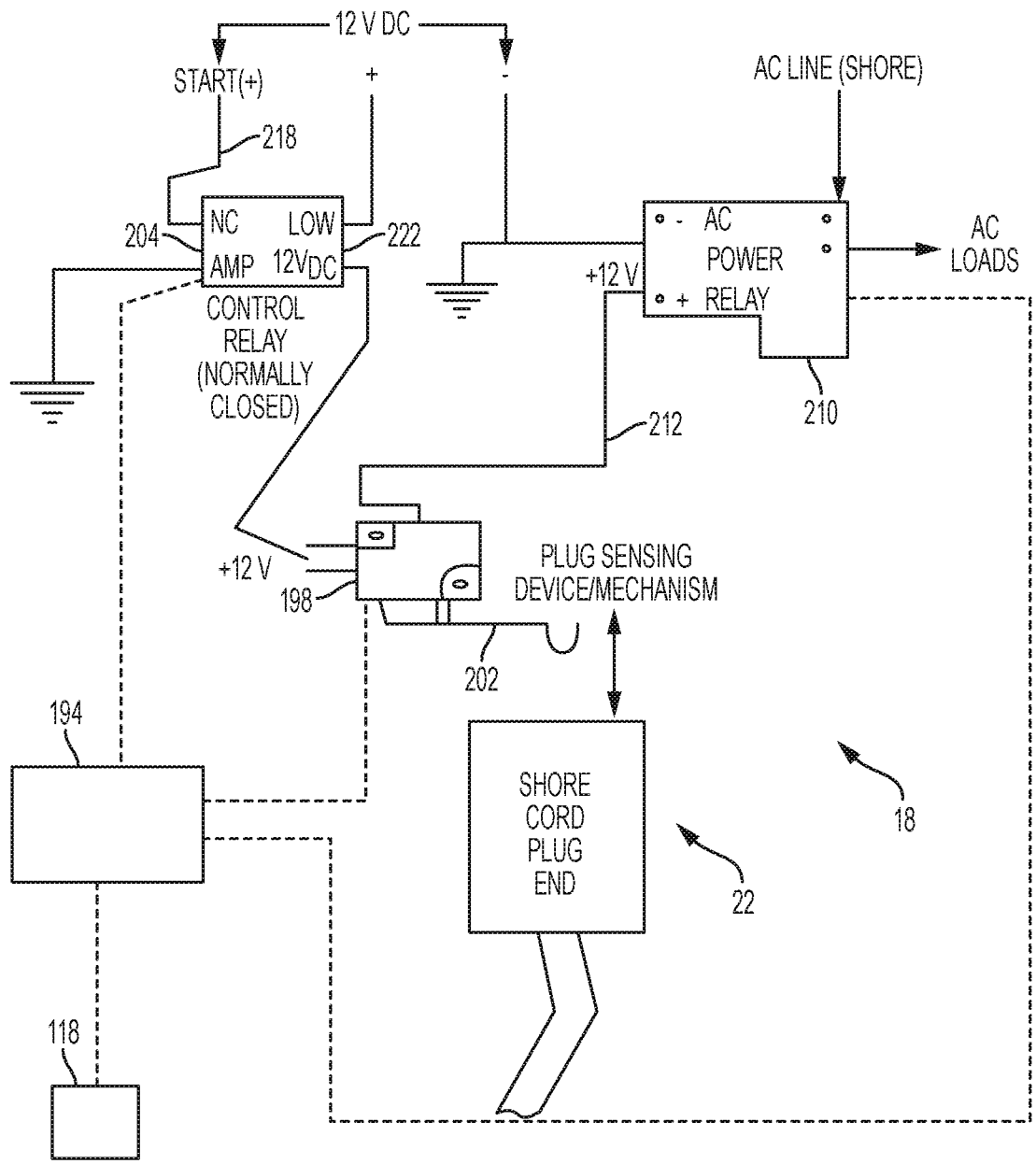
FIG. 8 is a schematic diagram of an electrical circuit of the disconnect apparatus.

As shown in FIG. 8, in one construction, the power circuit 18 includes an electronic controller, such as a microcontroller 194, a normally-open first switch 198 selectively closed by a plug sensor 202 and a normally-closed switch 204 selectively opened by a signal (e.g., a signal generated by engine starting). The controller 194 includes combinations of hardware and software that are operable to, among other things, configure and control operation of the apparatus 10.

The controller 194 includes a processing unit (e.g., a microprocessor, a microcontroller, or another suitable programmable device), non-transitory computer-readable media, and an input/output interface. The processing unit, the media, and the input/output interface are connected by one or more control and/or data buses. The computer-readable media stores program instructions and data. The processing unit is configured to retrieve instructions from the media and execute the instructions to perform the control processes and methods described herein.

The input/output interface transmits data from the controller 194 to external systems, networks, and/or devices and receives data from external systems, networks, and/or devices. The input/output interface stores data received from external sources to the media and/or provides the data to the processing unit.

The first switch 198 has a switch actuator 206 and a spring arm 208. In the illustrated construction, the plug sensor 202 includes a pivoting lever 202 a protruding through the aperture 140 into the receptacle 70. The plug sensor 202 is biased to the extended, switch-deactivating position, for example, by the spring arm 208.

The lever 202 a is engageable by the plug 22 (e.g., by the front face 38 of the plug housing 30) when inserted into the receptacle 70 (in other words, "senses" the plug 22). The lever 202 a pivots inwardly against the force of the arm 208 and causes the actuator 206 to close the first switch 198 (the switch-activating position). When closed (and when the second switch 204 is closed), the first switch 198 connects to a power relay 210 through a conductor 212 to allow power transfer through the power circuit 18 (e.g., from the power cord 14 to the load).

Figure 10:
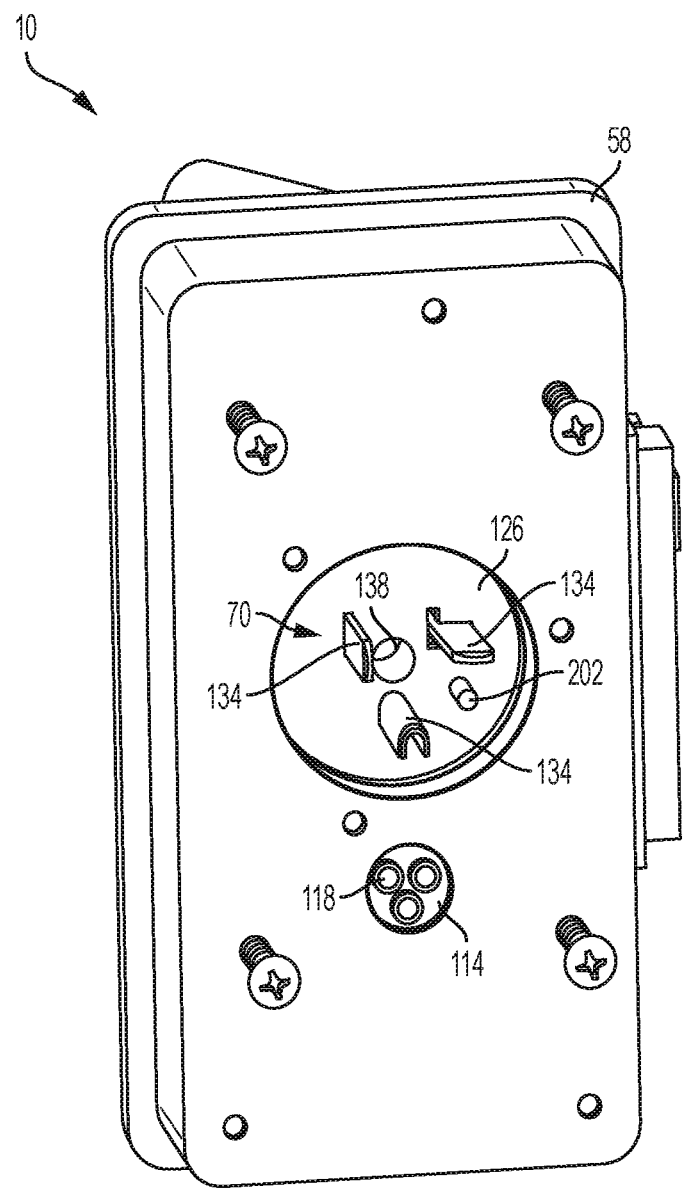
FIG. 10 is a front perspective view of the disconnect apparatus of FIG. 9 with a portion of the housing removed.
Figure 11:
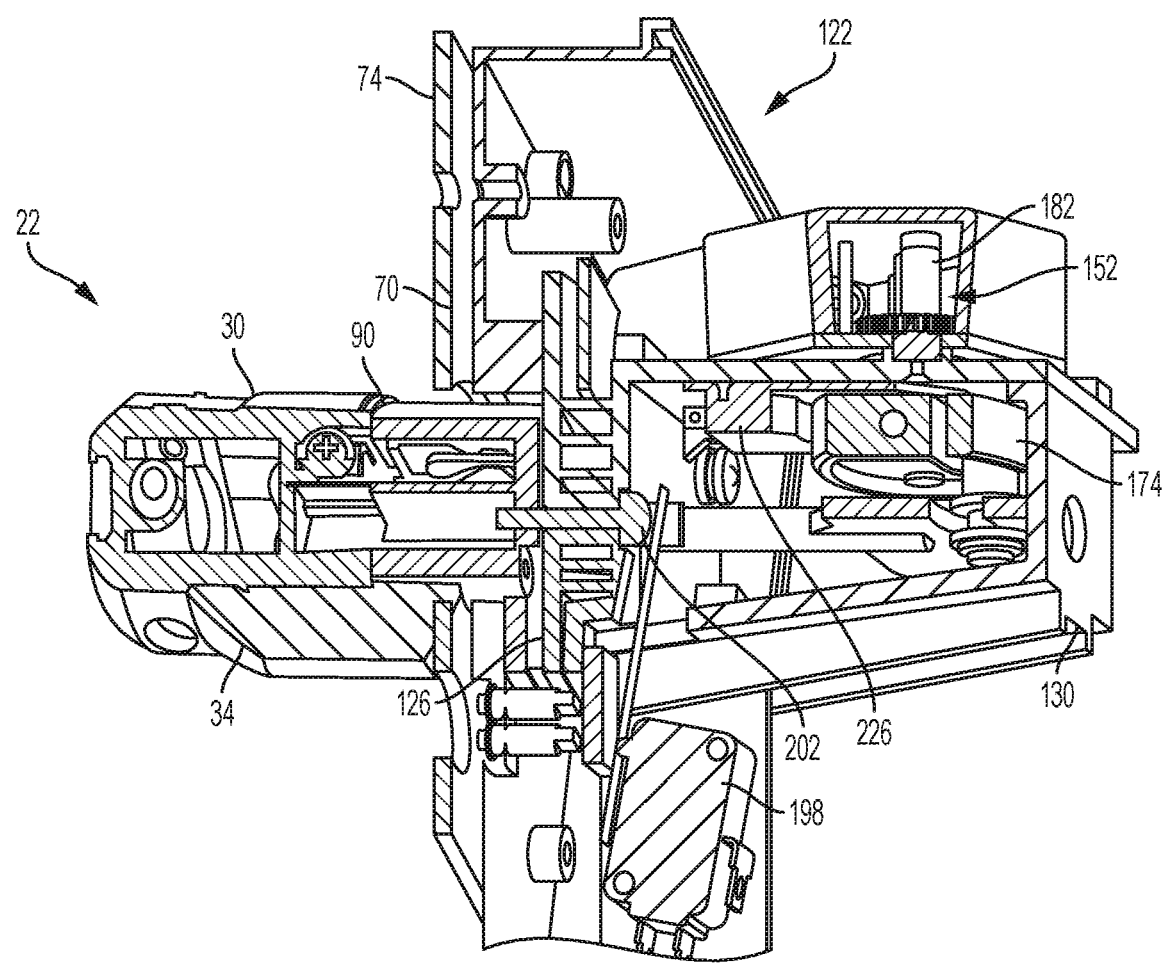
FIG. 11 is a partial cross-sectional view of the disconnect apparatus of FIG. 9 with a plug inserted in the receptacle.
Figure 12:
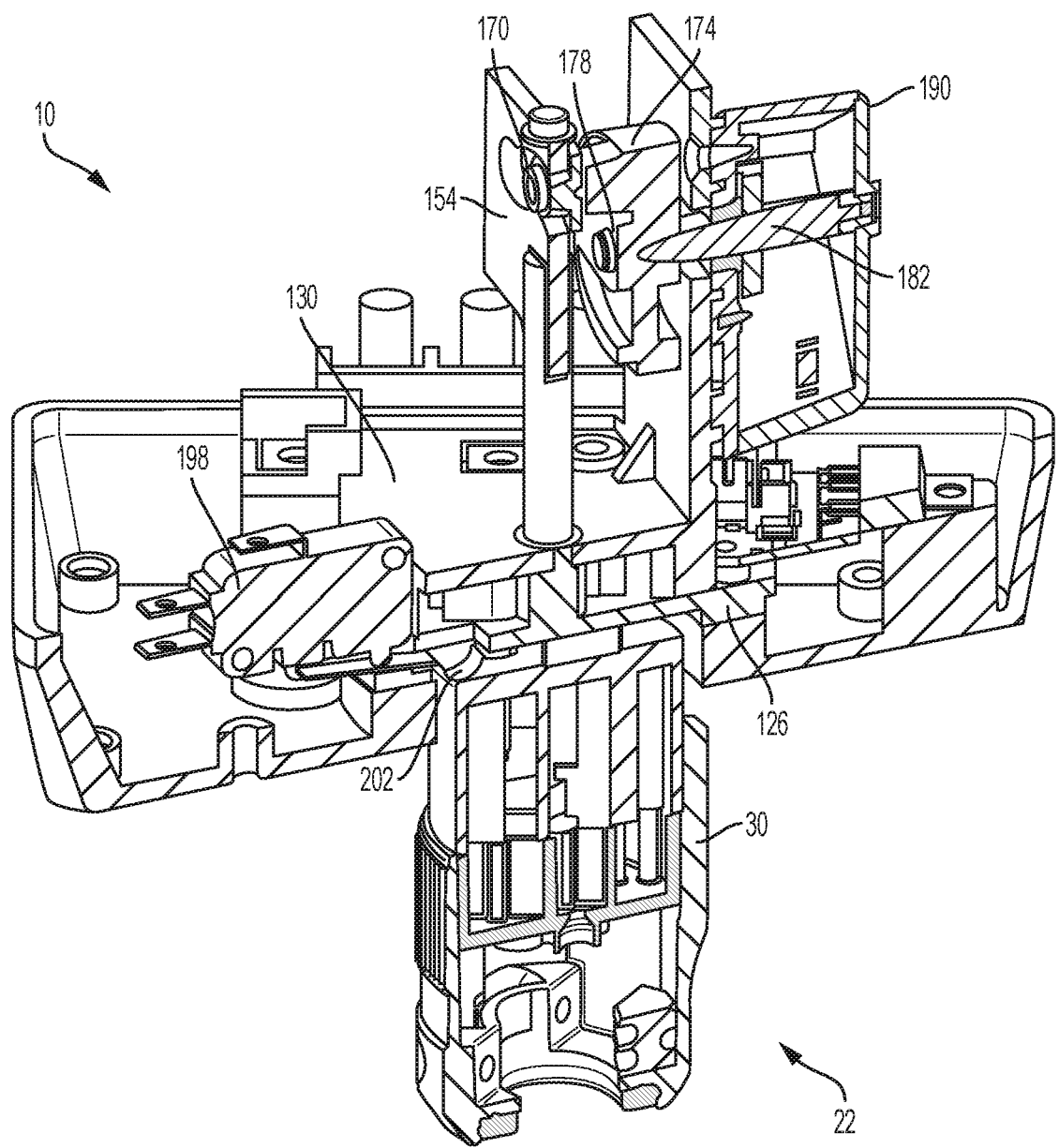
FIG. 12 is a partial cross-sectional view of another alternative construction of a disconnect apparatus.
Figure 13:
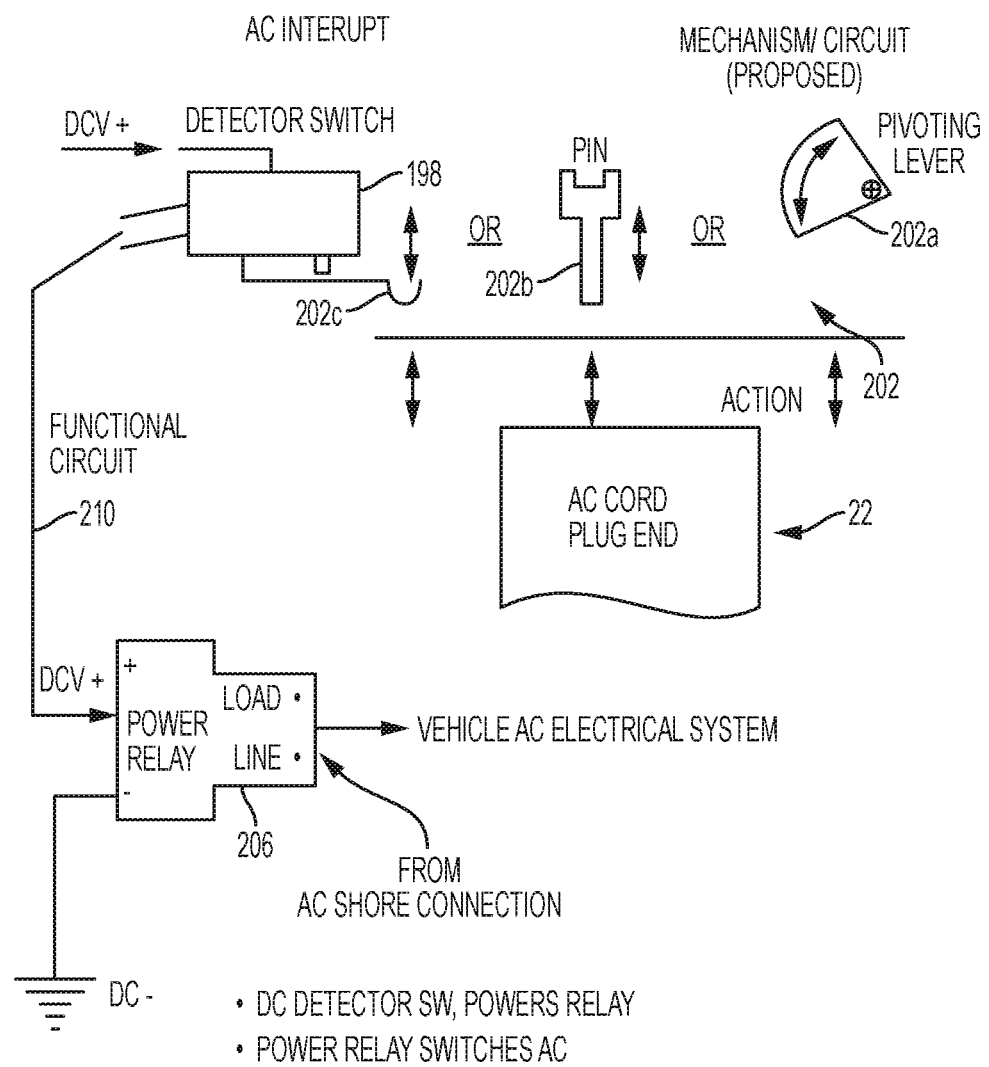
FIG. 13 is a schematic diagram of alternative constructions of a plug sensor and a portion of an electrical circuit for a disconnect apparatus.
Figure 14:
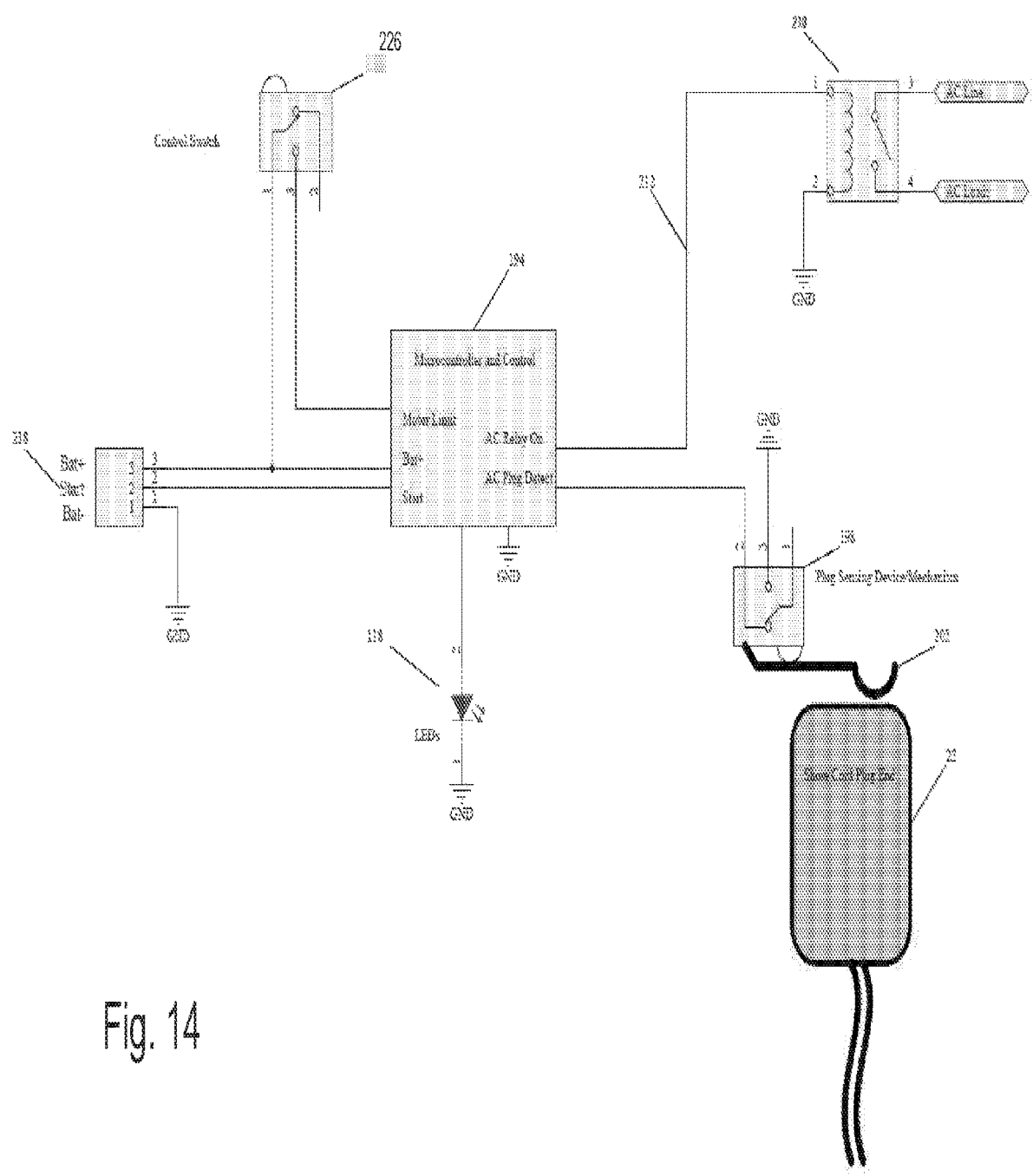
FIG. 14 is a schematic diagram of an alternative electrical circuit of a disconnect apparatus.

In other constructions and in some aspects, the plug sensor 202 can include a pin 202 b (see FIGS. 10-11 and 13; see also U.S. Pat. No. 7,431,601), a cantilever arm 202 c of the first switch 198 (see FIGS. 12-13), etc., engageable by the plug 22 to sense insertion of the plug 22 into the receptacle 70. In still other constructions (not shown) and in some aspects, the plug sensor 202 may include another type of sensor such as an electrical sensor, a magnetic sensor, a photo/light sensor, etc. operable to sense the inserted plug 22.

Also, in other constructions (not shown), the plug sensor 202 may positioned in a different location to sense a different portion of the plug 22. For example, the plug sensor 202 may be located on a radial wall of the receptacle 70 to be engaged by the outer plug surface 98 as the plug 22 is inserted.

The normally-closed second switch 204 receives a signal via conductors 218. In the illustrated construction, the conductors 218 are connected to a DC power source, such as a vehicle battery (not shown). Upon a disconnect condition (e.g., starting of the vehicle motor), DC power is supplied from the vehicle battery, and the second switch 204 opens, disabling a flow of electricity between the power cord 14 and the load. Meanwhile, upon starting of the vehicle engine, the motor 150 is activated to operate the scotch yoke assembly 146. The apparatus 10 thus operates, in some aspects, to automatically eject the power cord 14.

In the illustrated construction, the second switch 204 opens before the scotch yoke assembly 146 operates to eject the plug 22 from the receptacle 70 and to disconnect the plug terminals 26 and the apparatus terminals 134. Because AC power is disconnected before the terminals 26, 134 disconnect, arcing is inhibited or prevented. In the illustrated construction, the second switch 204 opens and AC power transfer is disabled before the first switch 198 is opened as the plug sensor 202 returns to the extended, switch-deactivating position during ejection of the plug 22.

It should be noted that, in the illustrated construction, the scotch yoke assembly 146 and the slider 162 begin operation in the retracted position (see FIGS. 4-5). The switch 226 is engaged by the protrusion 186 on the rotating member 174 to "sense" this position of the slider 162 and sends a signal representative of the retracted position to the microcontroller 194.

When the drive mechanism 46 is activated, the motor 150 begins to rotate the gear assembly 152, transferring torque to the output shaft 182. The output shaft 182, the rotating member 174 and the pin 170 rotate, causing the slider 162 to move toward the extended position. The end of the slider 162 contacts the front face 38 of the plug 22 and, as the motor 150 continues to turn, pushes the plug 22 out of the receptacle 70. At full extension of the slider 162 through the aperture 138, the plug 22 has been ejected from the receptacle 70 and the power cord 14 has been disconnected.

The motor 150 continues to rotate, and the slider 162 begins to retract toward the retracted position. As the slider 162 reaches the retracted position, the radial protrusion 186 on the rotating member 174 engages a third switch 226 (see FIG. 4), and the motor 150 is de-energized, leaving the slider 162 of the scotch yoke 146 in its original, fully retracted position.

In other constructions (not shown), AC power may be disabled (e.g., the second switch 204 may open) and/or the drive mechanism 46 may be activated in response to a different disconnect condition. For example, the disconnect condition may be based on another vehicle condition, such as the user occupying the driver's seat, a brake pedal or brake light being activated, an ignition key being turned, the vehicle running lights being activated, etc.

As an alternative or in addition to the automatic ejection signal, the apparatus 10 may incorporate an actuator (not shown) to disable AC power (e.g., open the second switch 204) and/or activate the drive mechanism 46. The actuator, such as a switch, button, etc., may be supported on the housing assembly 42 and/or on the vehicle (e.g., on the control panel, in the operator's cab, etc.). The actuator may cause the activation signal to be transmitted to open the second switch 204 and/or to activate the drive mechanism 46.

During removal of the plug 22 without operation of the drive mechanism (e.g., manual removal by pulling on the power cord 14 or the plug housing 30), removal of the plug 22 from the receptacle 70 will allow the plug sensor 202 to move under the biasing force of the spring arm 208 to the extended, switch-deactivating position such that the first switch 198 opens and AC power is disabled. The plug sensor 202 is constructed (e.g., the travel between its extended and retracted positions) so that the first switch 198 opens and AC power is disabled before the terminals 26, 134 are disconnected.

In other constructions (not shown) and in some aspects, the circuit 18 may include different components and have a different operation. For example, the circuit 18 may not include the second switch 204. Instead, the first switch 198 may control power transfer through the circuit 18, closing, to allow power transfer, when the plug 22 is inserted, and opening, to prevent or disable power transfer, with the plug 22 is ejected. Such a circuit is disclosed in U.S. Pat. No. 7,431,601.

In the illustrated construction, the microcontroller 194 controls operation of the apparatus 10. The microcontroller 194 communicates with the switches (e.g., switches 198, 204, 226), the AC power relay 210, the motor 150 and the indicators 118.

Figure 15:
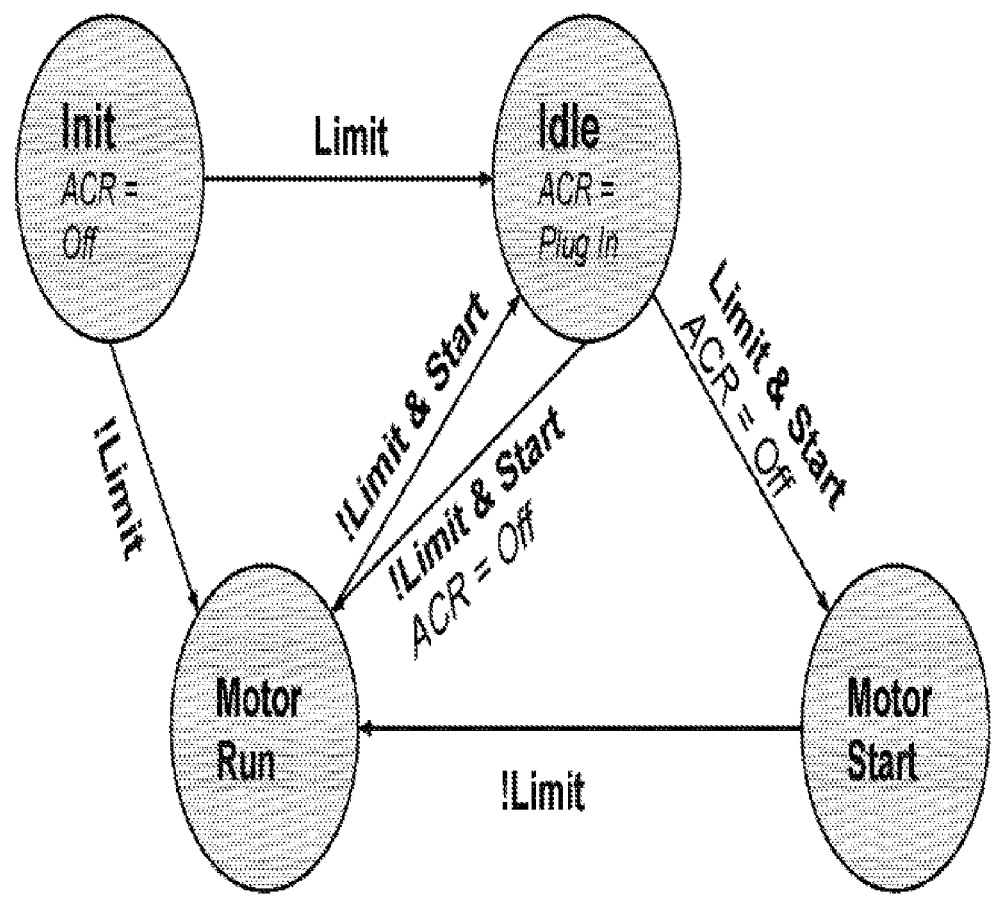
FIG. 15 is a flow chart of a method of controlling a disconnect apparatus performed by an electronic processor of the apparatus.
Figure 16:
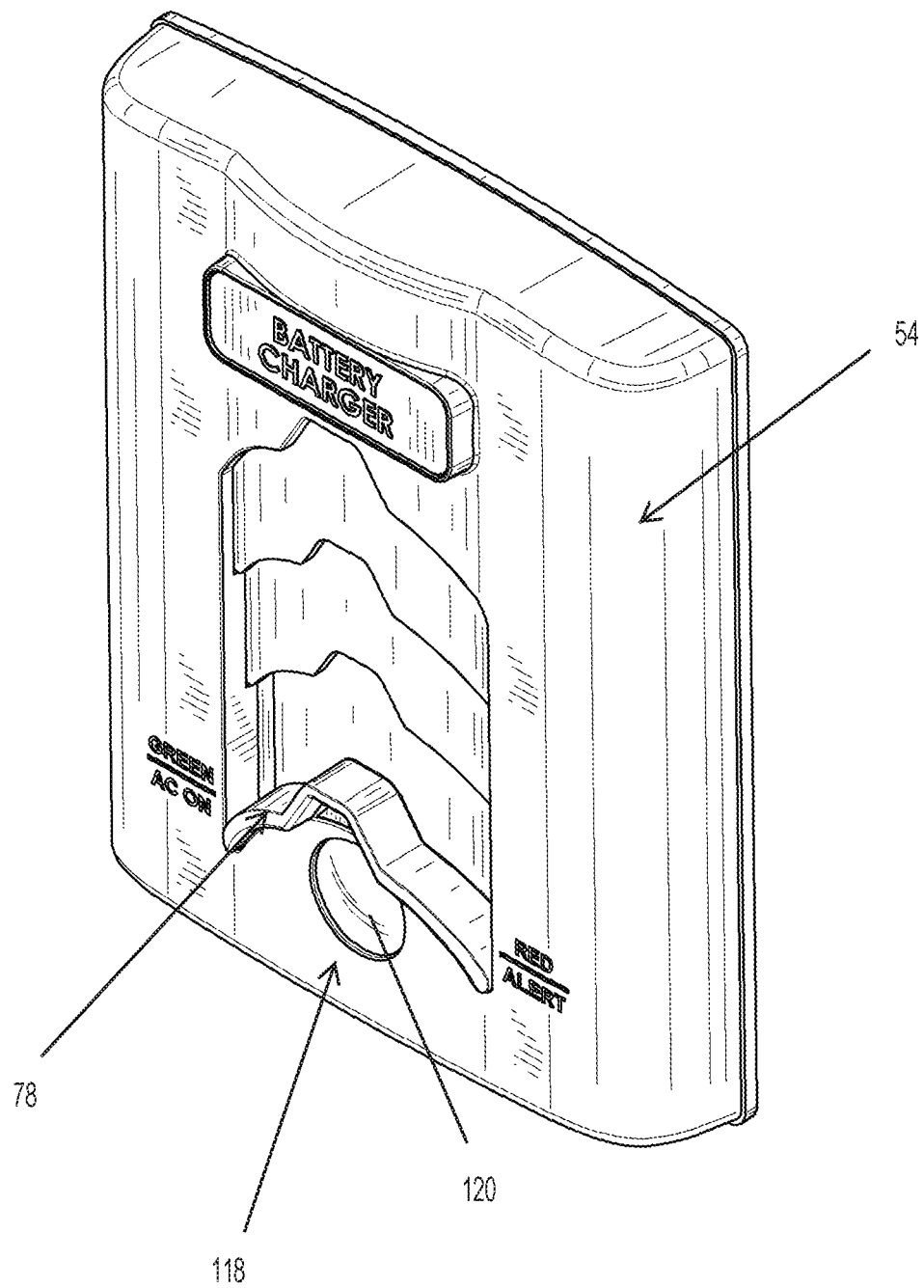
FIGS. 16-17 are views of a receptacle portion of the disconnect apparatus, illustrating a door assembly in a closed position.
Figure 17:
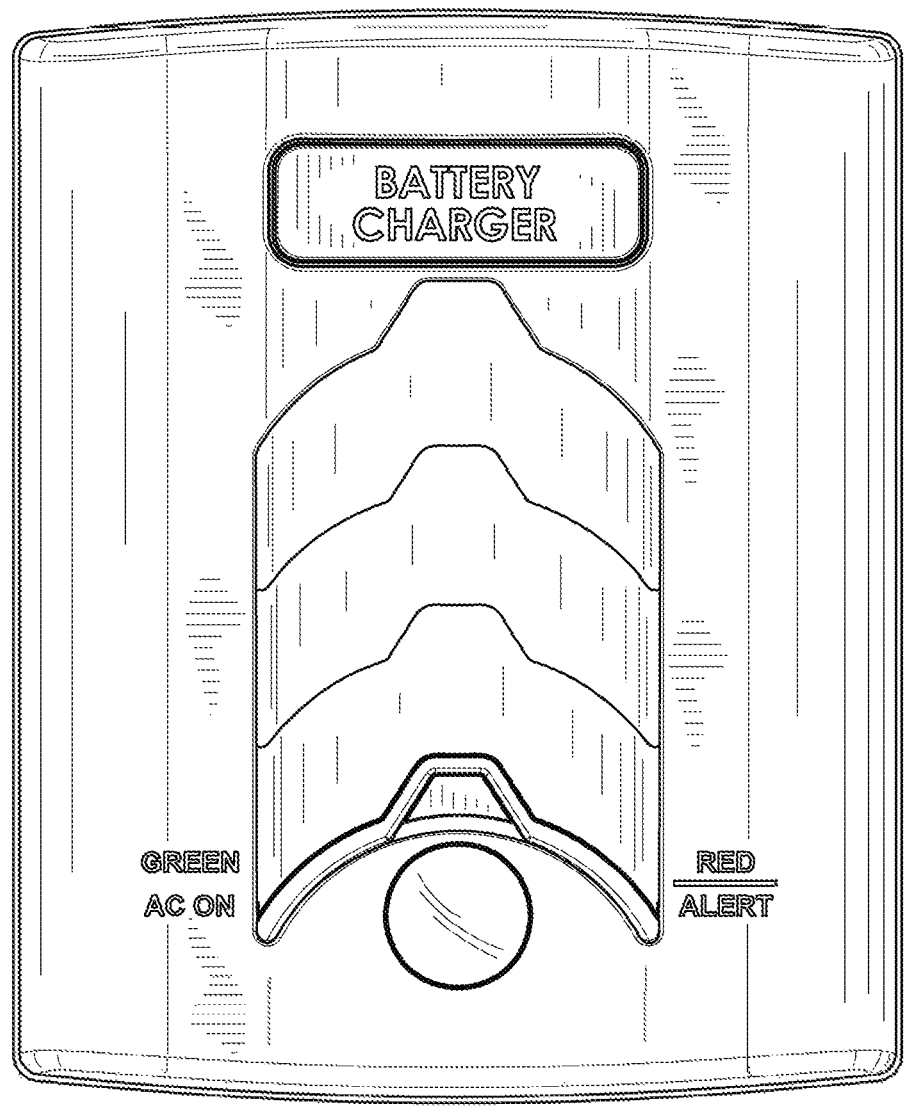
Figure 18:
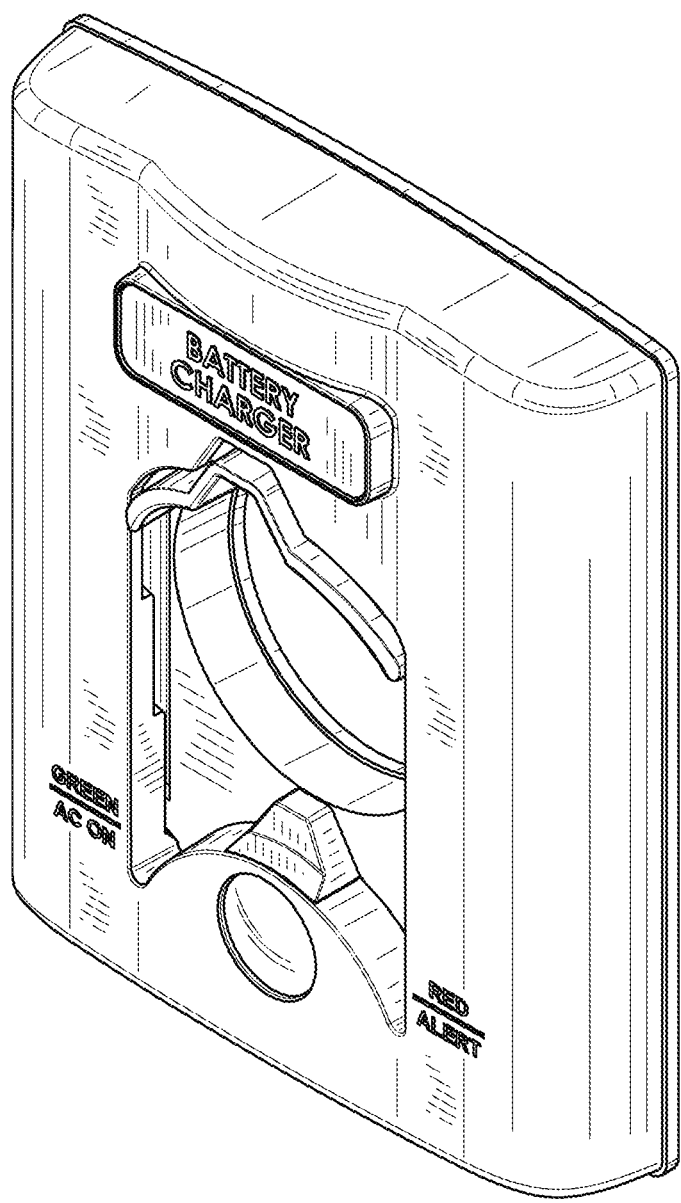
FIGS. 18-19 are views of the receptacle portion of FIGS. 18-19, illustrating the door assembly in the open position.
Figure 19:
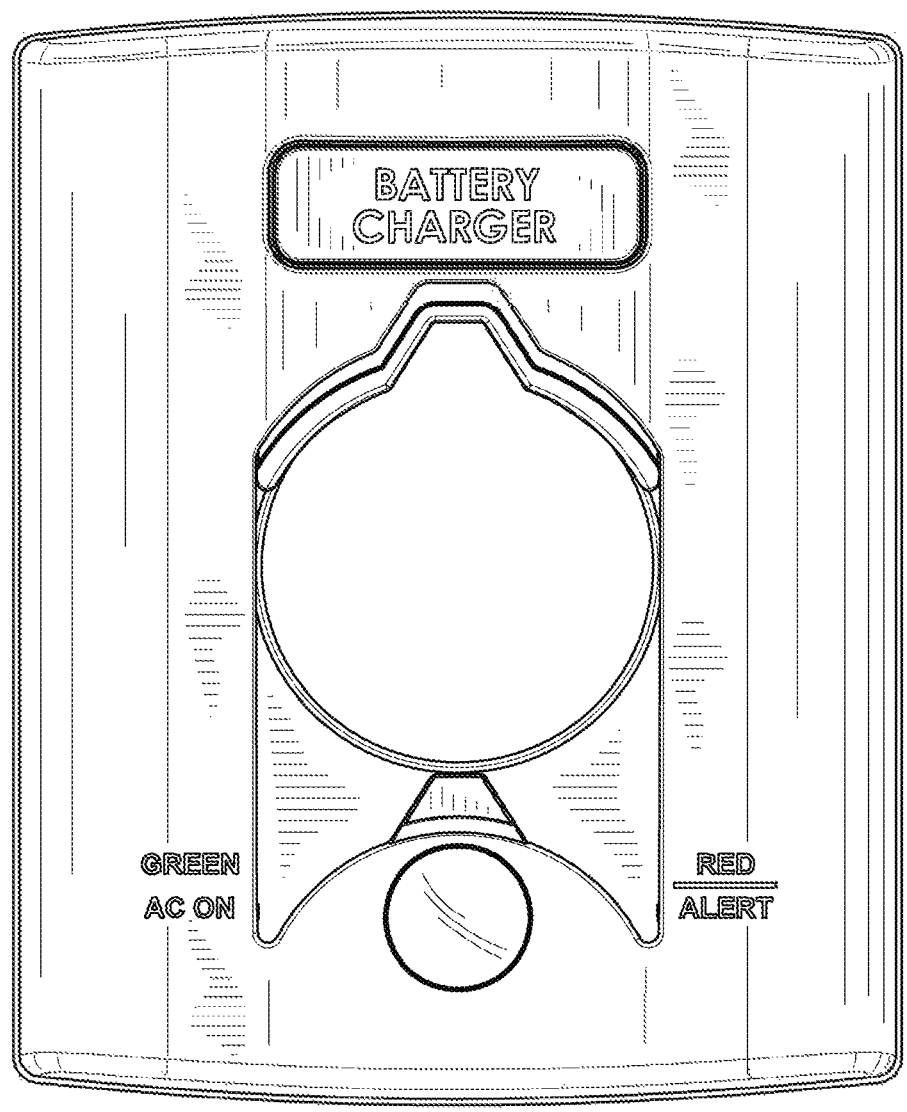
Figure 20:
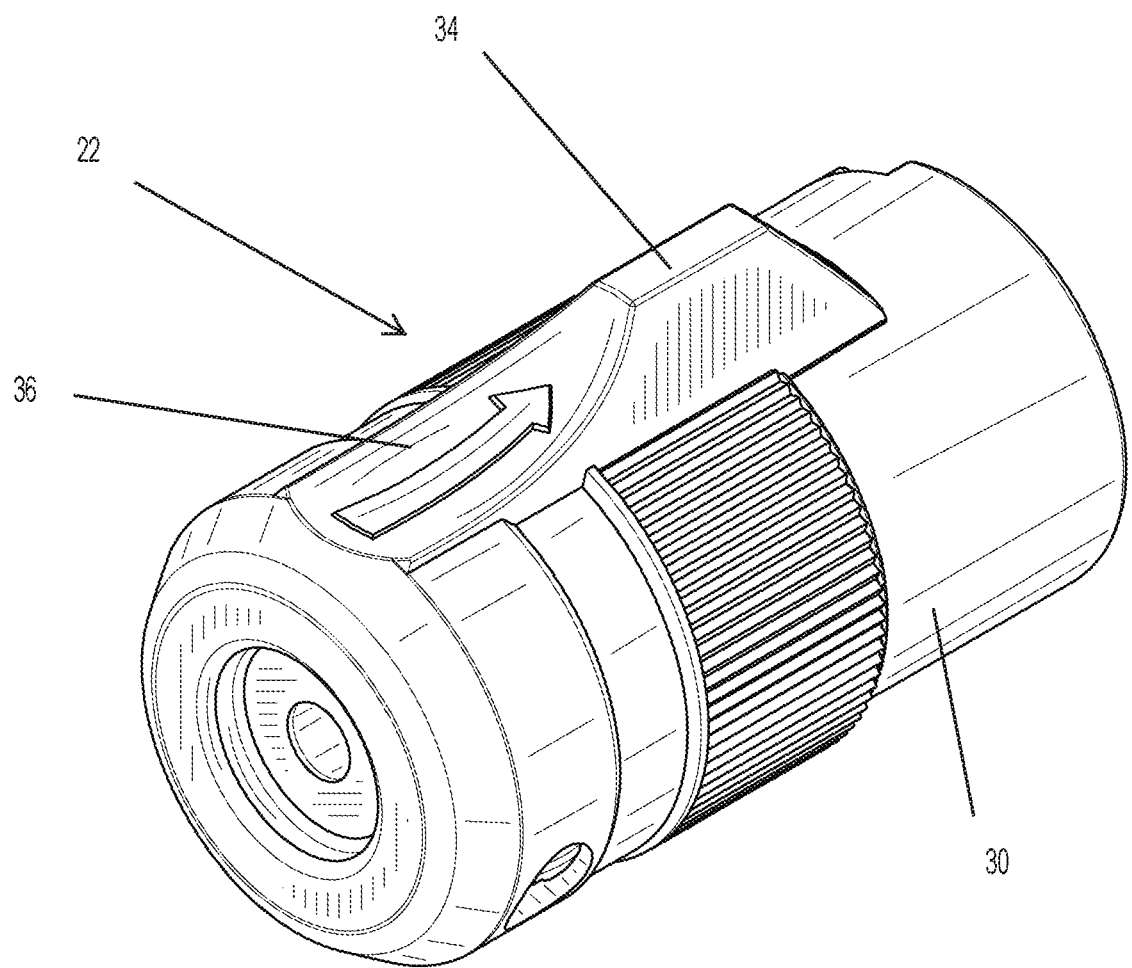
FIGS. 20-25 are views of a plug for use with the disconnect apparatus.
Figure 21:
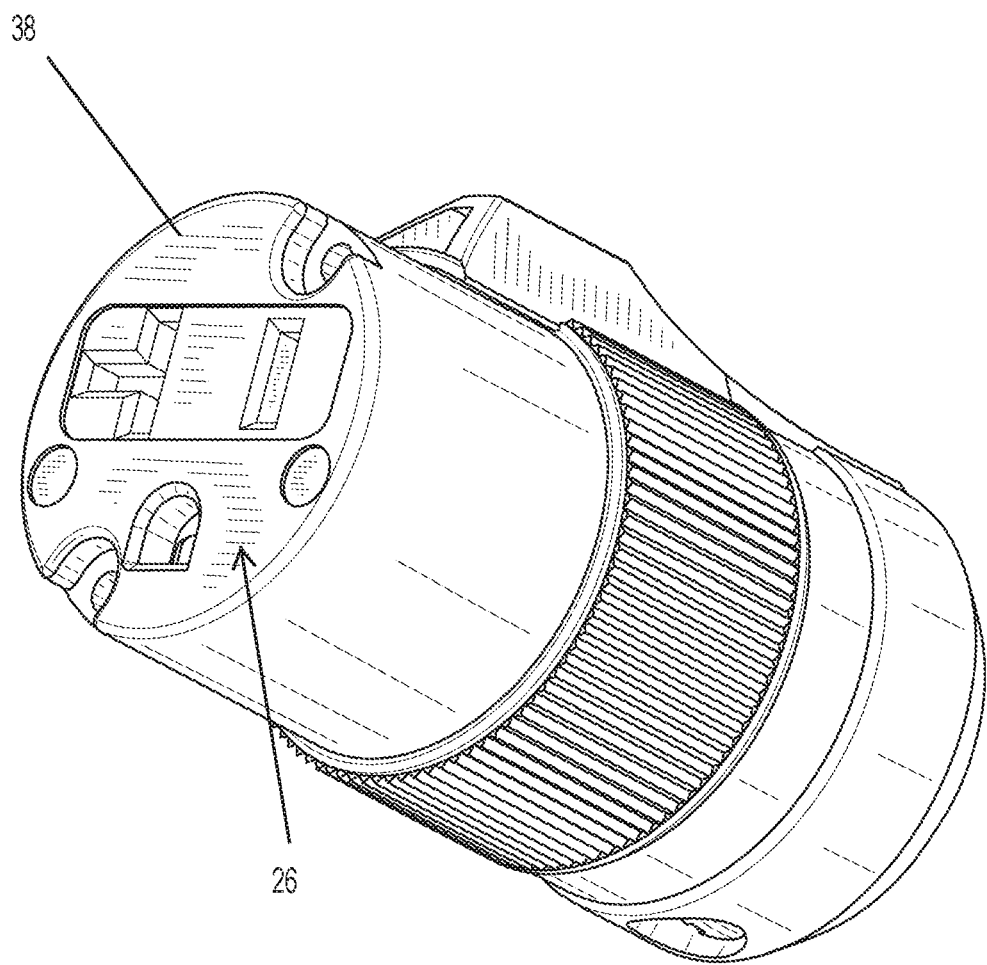
Figure 22:
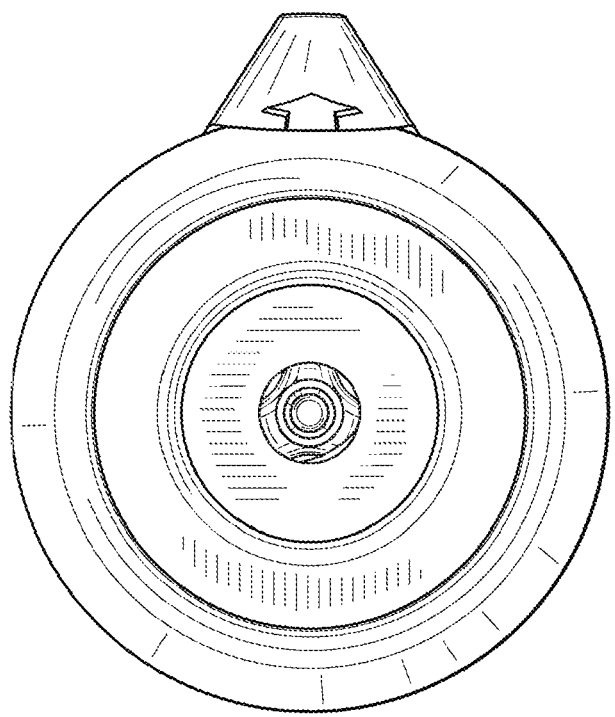
Figure 23:
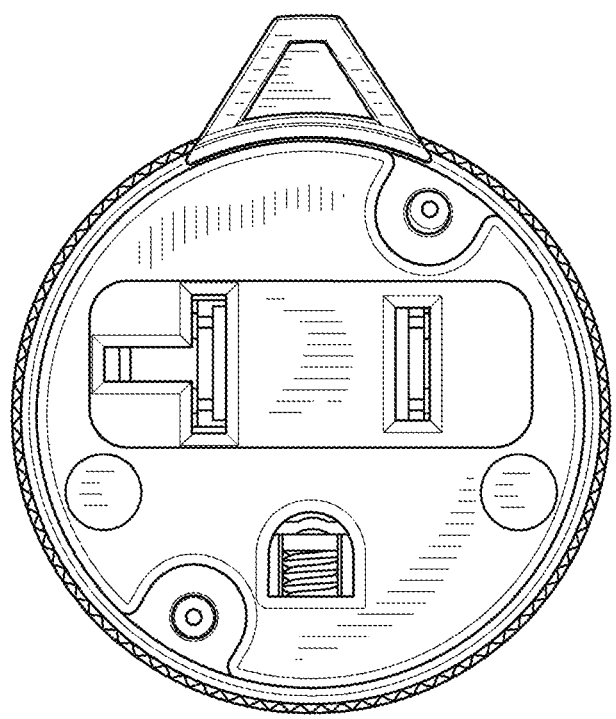
Figure 24:
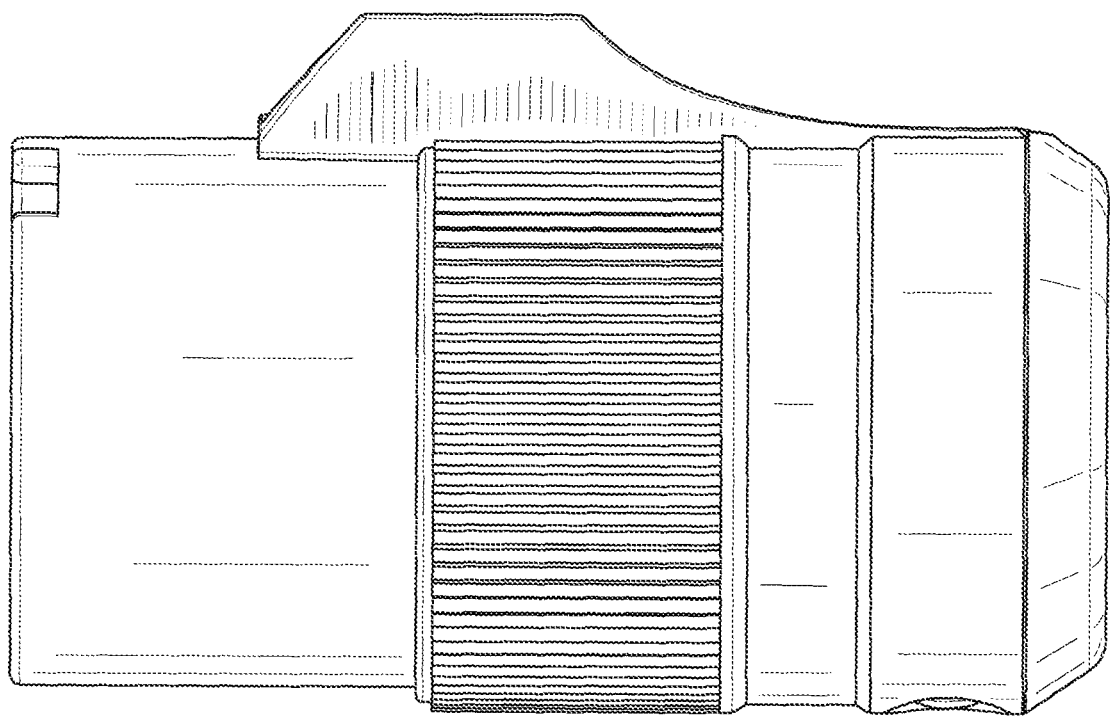
Figure 25:
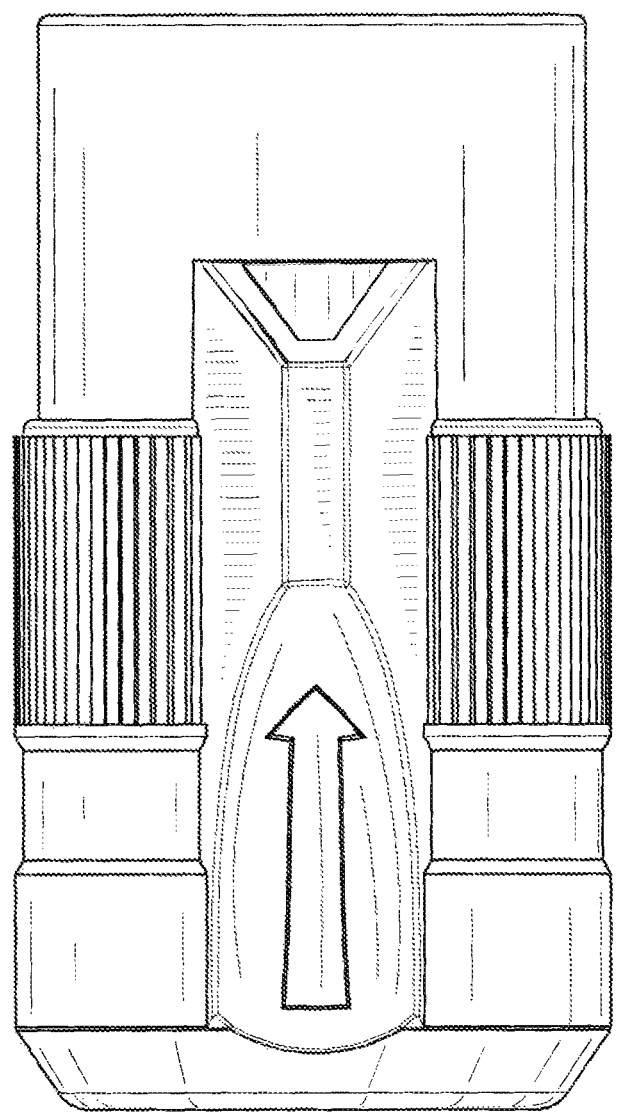

FIG. 15 includes a flowchart of a method of controlling the apparatus 10 implemented by the microcontroller 194. In operation of the circuit 18, the relay 210 is initially off ("Init"; "ACR=Off"). The microcontroller 194 determines the condition of the switch(es) 198, 204 and, through the switch 226, the condition of the drive mechanism 46 (e.g., the stroke position of the slider 162). If the switch 198 is closed, the microcontroller 194 determines that a plug 22 is in the receptacle 70 ("Plug In") and controls the LEDs 118 to indicate this condition (e.g., LEDs "ON"). If the microcontroller 194 also determines that the slider 162 is in the fully retracted position (through the switch 226; "IDLE") and the second switch 204, if provided, is closed, the microcontroller 194 controls the AC power relay 210 to allow AC power transfer and controls the LEDs 118 to indicate this condition (e.g., "LED=Green").

The microcontroller 194 determines if and when a disconnect condition (e.g., the vehicle engine is started) exists. For example, the microcontroller 194 receives a signal from the engine starter (not shown' "Start"). The microcontroller 194 controls the AC power relay 210 (and/or the second switch 204 to open), and AC power transfer is disabled. In the circuit 18 of FIG. 14, there is no switch 204; the microcontroller 194 receives the disconnect signal and controls the relay 210 to open and disable AC power transfer.

When there is a disconnect condition (e.g., starting of the vehicle engine), after AC power transfer is disabled, the microcontroller 194 also activates the motor 150 ("Motor Start") to operate the scotch yoke assembly 146. As described above, the slider 162 is driven ("Motor Run") to the extended position and ejects the plug 22 out of the receptacle 70. As the plug 22 is ejected, the plug sensor 202 moves to the extended, switch-deactivating position such that the first switch 198 opens, signaling this condition to the microcontroller 194.

Thereafter, the slider 162 is retracted to its original, retracted position, activating the third switch 226 to signal the microcontroller 194. The microcontroller 194 stops the motor 150 and prepares for subsequent operations (e.g., resets the second switch 204; "Limit").

In FIG. 15, definitions are as follows:
ACR: AC relay
Limit: Motor limit switch—indicates position of motor
Start: Start input
Plug In: Indicates the AC plug is present
AC_ON: True when AC power is present
AC_Reverse: True if reverse polarity is detected The microcontroller 194 also determines whether there is a fault condition with components of the apparatus 10 (e.g., the switches 198, 204, 226, the AC power relay, etc.). The microcontroller 194 also monitors the overall apparatus 10 to determine fault conditions, such as, for example, reverse polarity, ground fault, etc. If the microcontroller 194 determines a fault exists, the microcontroller 194 controls the LEDs 118 to indicate a fault (e.g., "LED=Flashing Red"). In other conditions (e.g., AC power relay 210 is ON and AC power is present ("ACR==ON && AC_ON==TRUE")), the LEDs 118 indicate this condition ("LED=Green").

The microcontroller 194 also monitors and records operational information for the apparatus 10. For example, the microcontroller 194 records operational cycles, including number of insertions and ejections of a plug 22. Certain components of the apparatus 10 may have a service life expectancy (e.g., 50,000 cycles for the drive mechanism 46). Based on the life expectancy and the recorded operational information, the microcontroller 194 may control the LEDs 118 to indicate an approaching end of expected service life (e.g., LEDs blinking as with a fault).

The microcontroller 194 may control the LEDs 118 to provide different indications for different conditions. For example, the LEDs 118 may include bi-color LEDs capable of providing different color indications (e.g., red for a fault; yellow for an approaching end of service life indication; green for normal operation, etc.). In one example, when the cord 14 is connected to the apparatus 10 and power is being transferred, the LEDs 118 are green; when the cord 14 is connected to the apparatus 10 and power is not being transferred, the LEDs are red.

The microcontroller 194 may also control the LEDs 118 to blink at different rates for different conditions (e.g., fast for a fault; slower for an approaching end of service life indication). The microcontroller 194 may control the LEDs 118 to provide different patterns or codes for different conditions (e.g., for each LED 118, ON/OFF, color, solid/blinking and rate, etc.).

In other constructions, the microcontroller 194 may not control the operation of components of the apparatus 10. In such constructions, the microcontroller 194 may monitor components of the apparatus 10 (e.g., the switches 198, 204, 226, the AC power relay 210, etc.). The microcontroller 194 may determine conditions of the components and operation of the apparatus 10 and communicate the determined condition(s) to the user through the LEDs 118.

In such constructions (or in constructions without a microcontroller 194), in response to the plug sensor 202, the switch 198 may close, to complete the circuit and allow AC power transfer, and open, to open the circuit and disable AC power transfer. Likewise, the switch 204 may be normally-closed to allow AC power transfer when the switch 198 closes and open in response to the disconnect condition signal, to open the circuit and disable power transfer. The AC power relay 210 may open and close in response to the condition of the switch 198, 204.

FIGS. 7 and 10 illustrate one type of terminal interface/plug style for the apparatus 10 and the plug 14 (e.g., for use in the United States). It should be understood that, for other countries, power grids, uses (e.g., outdoor versus indoor, commercial versus personal, industrial versus residential, etc.), etc., the terminal interface will be suitable for that country, grid, use, etc.

Figure 26:
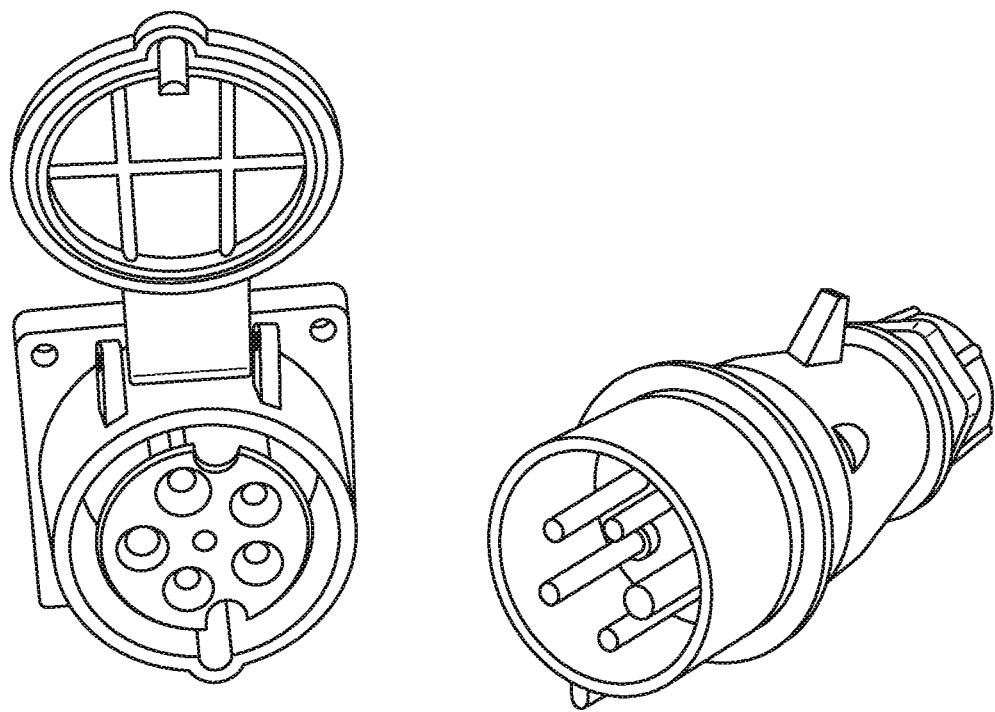
FIGS. 26-27 are views of alternative terminal interfaces for a plug and a disconnect apparatus.
Figure 27:
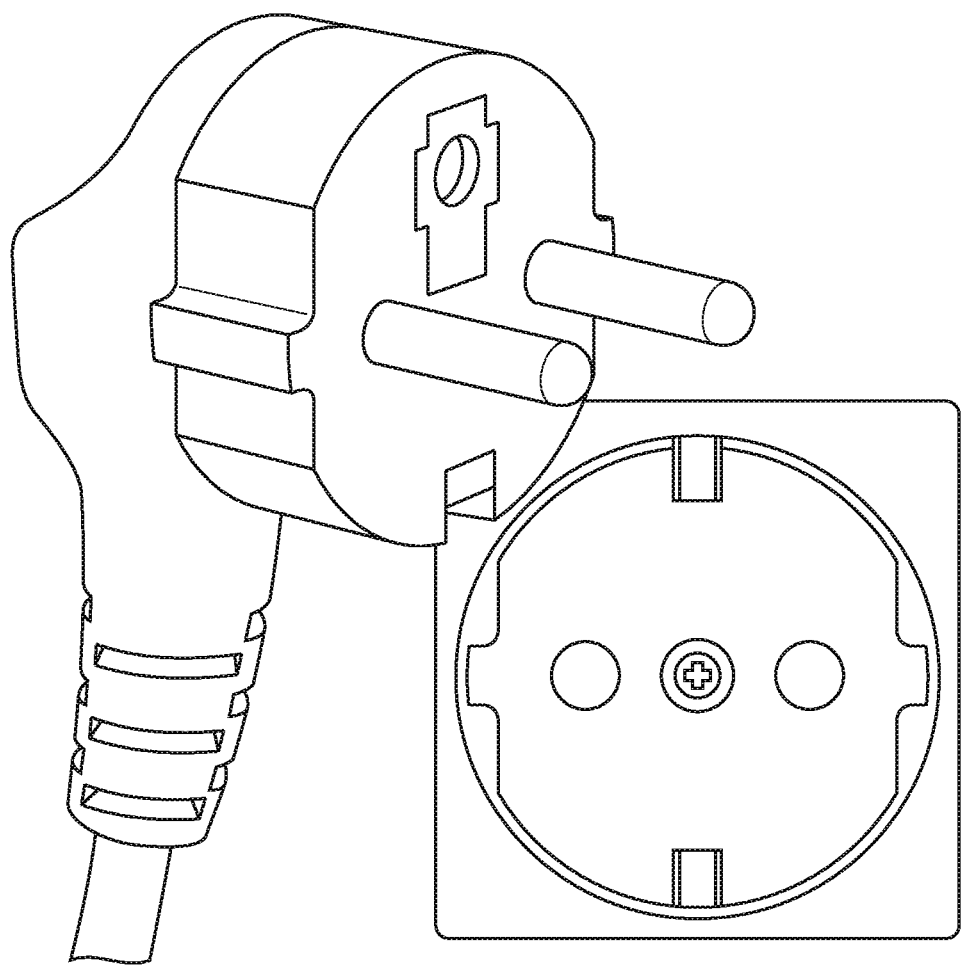

FIGS. 26-27 illustrate different types of terminal interfaces for the apparatus 10 and the plug 14, for example, for use in Europe. Components of the apparatus 10 would be scaled for different sized (e.g., larger or smaller) connectors and/or different length (e.g., longer or shorter) contacts (e.g., a longer or shorter ejection stroke). It should be understood that, in addition to the terminal interface, other components of the apparatus 10 (e.g., the circuit board) may change to accommodate the different voltage, frequency, amperage, etc., of the different electrical grid.

Thus, the invention may provide, among other things, a mechanism for ejecting a power cord from a power circuit. The ejection mechanism may include a scotch yoke assembly providing a significant and deliberate force to eject a plug from a receptacle. Also, the ejection mechanism may include a circuit with switches to eliminate or inhibit arcing by disabling electrical power to the contacts before the contacts disconnect and, in some cases, before the drive mechanism even begins to eject the plug.

Some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

One or more independent features or independent advantages may be set forth in the claims.

We claim:

1. A cord disconnect apparatus comprising:
   a housing defining a receptacle for a plug of a cord;
   an ejection mechanism including a scotch yoke assembly supported by the housing, the scotch yoke assembly being reciprocatable to engage and eject the plug from the receptacle;
   a motor configured to effectuate reciprocation of the scotch yoke assembly; and
   a controller configured to control the motor to move the scotch yoke assembly between a retracted position and an extended position where a portion of the scotch yoke assembly engages a plug housing of the plug to eject the plug from the receptacle.

2. The apparatus of claim 1, wherein the scotch yoke assembly includes a link defining a slot, and a piston connected to the link, the piston being extendable into the receptacle to eject the plug from the receptacle.

3. The apparatus of claim 2, wherein the piston is slidable between a retracted position and an extended position where it engages a plug housing of the plug to eject the plug from the receptacle.

4. The apparatus of claim 3, further comprising a rotating member supporting an eccentric pin, the eccentric pin being positioned in the slot, the rotating member being rotatable about an axis to cause the eccentric pin to revolve around the axis, movement of the eccentric pin causing reciprocation of the piston between the extended position and the retracted position.

5. The apparatus of claim 4, wherein the piston reciprocates along an ejection axis, and wherein the link has a slot surface defining the slot, the slot surface having an intermediate portion and a first outer portion and a second outer portion on opposite sides of the intermediate portion, the first outer portion and the second outer portion being in alignment and oriented transverse to the axis, the intermediate portion projecting axially from the first outer portion and the second outer portion, the pin moving along the first outer portion, the intermediate portion and the second outer portion during movement of the eccentric pin.

6. The apparatus of claim 4, further comprising a gear assembly driven by the motor, the gear assembly being operable to rotate the rotating member.

7. The apparatus of claim 6, further comprising an apparatus circuit supported by the housing, the apparatus circuit being connectable between a first power circuit and a second power circuit, the apparatus circuit including a first switch configured to close in response to the plug being in the receptacle, and a second switch configured to open in response to a disconnect signal, transfer between first power circuit and the second power circuit being facilitated when the first switch and second switch are closed, transfer being prevented when the first switch or the second switch is open.

8. The apparatus of claim 7, further comprising a plug sensor on the housing that is configured to be engaged by the plug housing when the plug is inserted into the receptacle and, upon engagement, to close the first switch.

9. The apparatus of claim 7, wherein the controller is further configured to:
   receive a first signal from the first switch representative of the first switch being open;
   receive the disconnect signal; and
   control the motor to rotate the rotating member so as to eject the plug from the receptacle.

10. The apparatus of claim 9, wherein the controller is configured to open the second switch prior to controlling the motor to eject the plug from the receptacle so as to inhibit arcing when the plug is ejected.

11. The apparatus of claim 1, wherein the controller is configured to control the motor based on positions of the first switch and the second switch.

12. The apparatus of claim 1, wherein the plug is insertable into the receptacle along an insertion axis, the plug having a plug housing with a radial outer surface, and wherein the apparatus further comprises a door operable to close the receptacle, the door including an axially-extending door surface, the radial outer surface of the plug housing being engageable with the door surface and the plug being movable transverse to the insertion axis to open the door.

13. A method of ejecting a cord, the cord including a plug receivable in a receptacle defined by a housing, the method comprising:
   reciprocating a scotch yoke assembly to engage and eject the plug from the receptacle.

14. The method of claim 13, wherein reciprocating the scotch yoke assembly includes a piston extendable into the receptacle to engage and eject the plug, and wherein the method further comprises:
   controlling a motor to move the piston to an extended position so as to push the plug out of the receptacle.

15. The method of claim 13, wherein the cord is connectable to a first power circuit, and wherein the method further comprises:
   connecting an apparatus circuit supported by the housing between a second power circuit and the first power circuit to facilitate transfer between the first power circuit and the second power circuit when a first switch in the apparatus circuit closes in response to the plug being in the receptacle and when a second switch in the apparatus circuit is closed: and
   preventing transfer between the first power circuit and the second power circuit when the first switch is open or when the second switch opens in response to a disconnect signal.

16. The method of claim 15, further comprising opening the second switch prior to ejecting the plug from the receptacle so as to inhibit arcing when the plug is ejected.

17. A cord disconnect apparatus comprising:
   a housing defining a receptacle for a plug of a cord; and an ejection mechanism supported by the housing, the ejection mechanism being reciprocatable to engage and eject the plug from the receptacle; and wherein the plug is insertable into the receptacle along an insertion axis, the plug having a radial outer surface, and wherein the apparatus further comprises a door operable to close the receptacle, the door including an axially-extending door surface, the outer surface of the plug being engageable with the door surface and the plug being movable transverse to the insertion axis to open the door.

18. The apparatus of claim 17, wherein the plug includes a plug terminal, wherein the apparatus further comprises an apparatus terminal engageable with the plug terminal when the plug is in the receptacle in a first orientation of the plug about the insertion axis, the apparatus terminal and the plug terminal not being engageable in a different second orientation of the plug about the insertion axis, and wherein the apparatus further comprises a locating assembly operable to orient the plug in the first orientation for insertion.

19. The apparatus of claim 17, wherein the ejection mechanism includes a scotch yoke assembly supported by the housing and being reciprocatable to engage and eject the plug from the receptacle.

\* \* \* \* \*